United States Patent
Imai

(10) Patent No.: US 9,704,131 B2
(45) Date of Patent: Jul. 11, 2017

(54) INFORMATION PROCESSING APPARATUS, STORAGE MEDIUM, INFORMATION PROCESSING METHOD, AND INFORMATION PROCESSING SYSTEM

(75) Inventor: Daiji Imai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/006,002

(22) Filed: Jan. 13, 2011

(65) Prior Publication Data

US 2012/0079039 A1    Mar. 29, 2012

(30) Foreign Application Priority Data

Sep. 24, 2010  (JP) ................................ 2010-214463

(51) Int. Cl.
| | | |
|---|---|---|
| *G06F 15/16* | (2006.01) | |
| *G06Q 10/10* | (2012.01) | |
| *G06Q 30/02* | (2012.01) | |

(52) U.S. Cl.
CPC ............. *G06Q 10/10* (2013.01); *G06Q 30/02* (2013.01)

(58) Field of Classification Search
CPC .............................. G06Q 10/10; G06Q 30/02
USPC ................................................. 709/206, 204
See application file for complete search history.

(56) References Cited

U.S. PATENT DOCUMENTS

| | | | |
|---|---|---|---|
| 7,885,407 B2 * | 2/2011 | Shimosato | H04L 9/0662 380/201 |
| 2004/0218902 A1 * | 11/2004 | Yanagita | H04N 5/91 386/248 |
| 2006/0122716 A1 | 6/2006 | Bortnik et al. | |
| 2007/0206101 A1 * | 9/2007 | Ueno | G06F 17/3089 348/211.99 |

(Continued)

FOREIGN PATENT DOCUMENTS

| | | |
|---|---|---|
| JP | 2002-015219 | 1/2002 |
| JP | 2005-018204 | 1/2005 |

(Continued)

OTHER PUBLICATIONS

Xbox. Xbox LIVE Marketplace with Xbox 360 [online]. Microsoft Corporation 2008 [retrieved on Sep. 3, 2012]. Retrieved from the Internet <URL: www.xbox.com/en-US/support/systemuse/xbox360/livefeatures/marketplace.htm>.*

(Continued)

*Primary Examiner* — Davoud Zand
(74) *Attorney, Agent, or Firm* — Nixon & Vanderhye P.C.

(57) ABSTRACT

An information processing apparatus includes: application execution means for executing an application program; metadata storage means for storing metadata corresponding to the application program; input means for receiving a message input by a user based on an operation of the user; selection means for selecting the metadata stored by the metadata storage means, in accordance with an operation of the user; transmission means for transmitting the message (Continued)

received by the input means and the metadata selected by the selection means to another information processing apparatus; reception means for receiving a message and metadata corresponding to an application program from said another information processing apparatus; and information output means for outputting the message and the metadata received by the reception means.

18 Claims, 17 Drawing Sheets

(56) References Cited

U.S. PATENT DOCUMENTS

| | | | |
|---|---|---|---|
| 2009/0111581 A1* | 4/2009 | Ostergren et al. | 463/42 |
| 2010/0146442 A1 | 6/2010 | Nagasaka et al. | |
| 2010/0153721 A1* | 6/2010 | Mellqvist | 713/168 |
| 2010/0192173 A1 | 7/2010 | Mizuki et al. | |
| 2012/0072312 A1* | 3/2012 | Lange | G06Q 30/06 705/27.1 |
| 2013/0139163 A1 | 5/2013 | Nagasaka et al. | |
| 2014/0101277 A1* | 4/2014 | Rao | G06Q 10/101 709/206 |
| 2016/0189315 A1* | 6/2016 | Anania | G06Q 50/01 705/319 |

FOREIGN PATENT DOCUMENTS

| | | |
|---|---|---|
| JP | 2006-158955 A | 6/2006 |
| JP | 2007-179223 A | 7/2007 |
| JP | 2010-157207 | 7/2010 |
| JP | 2010-177939 | 8/2010 |

OTHER PUBLICATIONS

Xbox. Xbox 360 Account Management FAQ [online]. Microsoft Corporation 2008 [retrieved Sep. 3, 2010]. Retrieved from the Internet <URL: www.xbox.com/en-US/support/systemuse/xbox360/account/intro-accountfaq.htm>.*
Xbox. Top Arcade Games at Bargain Prices [online]. Microsoft Corporation 2008 [retrieved on Sep. 3, 2012]. Retrieved from the Internet <URL: www.xbox.com/en-US/games/arcadehits/default.htm>.*

* cited by examiner

F I G. 1 7
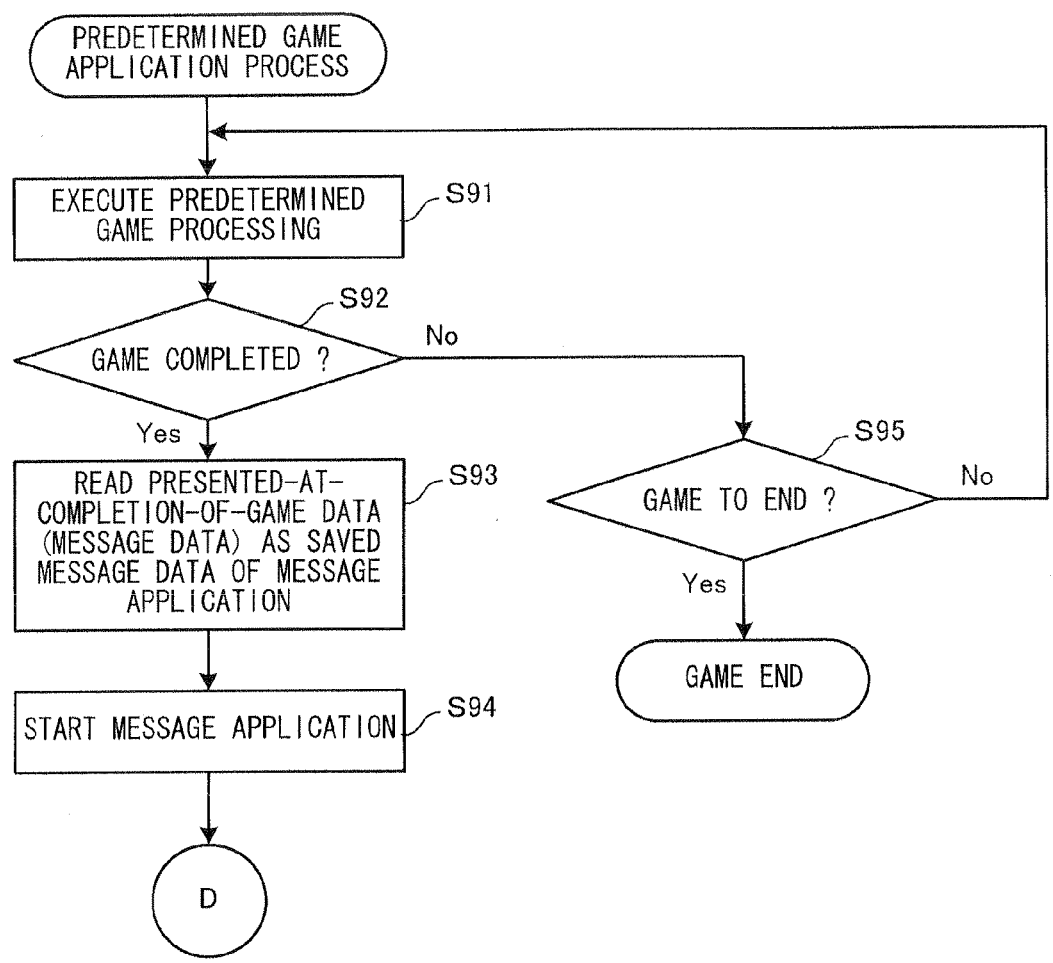

INFORMATION PROCESSING APPARATUS, STORAGE MEDIUM, INFORMATION PROCESSING METHOD, AND INFORMATION PROCESSING SYSTEM

CROSS REFERENCE TO RELATED APPLICATION

The disclosure of Japanese Patent Application No. 2010-214463, filed on Sep. 24, 2010, is incorporated herein by reference.

BACKGROUND AND SUMMARY

Technical Field

The technology presented herein relates to an information processing apparatus, a storage medium, an information processing method, and an information processing system, and in particular, relates to an information processing apparatus, a storage medium, an information processing method, and an information processing system that, for example, transmit metadata of a content.

Description of the Background Art

Conventionally, there is a technique for a user to introduce an article to another user in online shopping using the Internet and the like. For example, in a system disclosed in Japanese Laid-Open Patent Publication No. 2002-15219, a user clicks an introduction button of an article on a page for ordering the article, fills out a form including the e-mail address of an introduction partner, an introduction message, and the like, and gives an instruction to transmit the order. This causes an e-mail, including a URL assigned to an introduction screen of the article, to be transmitted to the e-mail address of the introduction partner.

The conventional system, however, is not a system where the user introduces to another user only a content (article) that has been, for example, purchased by the user, and stored in the user's apparatus. That is, the conventional system may allow the user to introduce to another user even an article neither owned nor used by the user. From the standpoint of said another user who receives the introduction to the article, they may receive an introduction to an article not even owned by the user who introduces it. Consequently, in the conventional system, it is difficult to maintain a high reliability of the introduction to an article.

SUMMARY

Therefore, it is a feature of the present technology to provide an information processing apparatus, a storage medium, an information processing method, and an information processing system that are capable of maintaining a high reliability of the introduction to a content (article) between users.

The present technology has the following configuration.

An example embodiment presented herein is an information processing apparatus capable of communicating with another information processing apparatus, the information processing apparatus including: application execution means, metadata storage means, input means, selection means, transmission means, reception means, and information output means. The application execution means executes an application program. The metadata storage means stores metadata corresponding to the application program. The input means receives a message input by a user based on an operation of the user. The selection means selects the metadata stored by the metadata storage means, in accordance with an operation of the user. The transmission means transmits the message received by the input means and the metadata selected by the selection means to said another information processing apparatus. The reception means receives a message and metadata corresponding to an application program from said another information processing apparatus. The information output means outputs the message and the metadata received by the reception means.

With this configuration, the user can transmit the metadata stored in the metadata storage means (a storage data memory 34 or the like) included in the user's own information processing apparatus to another information processing apparatus, together with a message.

Further, the information processing apparatus may further include metadata acquisition means for acquiring the metadata from a first storage section or a second storage section having stored therein the application program and the metadata corresponding to the application program, and causing the metadata storage means to store the acquired metadata, the first storage section detachably attached to the information processing apparatus, the second storage section included in the information processing apparatus.

With this configuration, the user can transmit metadata together with a message to another information processing apparatus, the metadata corresponding to: the application program stored in the first storage section (a cartridge 29 or the like) attachable and detachable to and from the information processing apparatus that has been, for example, purchased; the application program copied from the first storage section into the second storage section included in the information processing apparatus; or the application program that has been, for example, purchased through a server or the like, and downloaded to the second storage section. That is, the user can introduce to a partner user only the application program that the user has (or had) at hand, for example, through purchase. Consequently, it is possible to maintain a high reliability of the introduction to a content (application program) between users.

Further, the input means may provide to the user an input interface for receiving the message input by the user, and the selection means may provide an operation portion for the user to select the metadata, in the input interface provided by the input means.

With this configuration, when the input means is receiving the message input by the user, the selection means allows the user to select the metadata stored by the metadata storage means. For example, when the input of the message is being received, a list of the metadata stored by the metadata storage means may be displayed together with a message input screen, so that the user can simultaneously input a message and select metadata. Alternatively, when the input means is receiving the message input by the user, an operation of calling up a list of the metadata stored by the metadata storage means may be received from the user, so that the list is displayed when the calling-up operation has been performed. In these cases, the user can seamlessly input a message and select metadata.

Further, the information processing apparatus may further include detailed information acquisition means for, based on the metadata received by the reception means, acquiring detailed information about the application program corresponding to the metadata, and the information output means may output the detailed information acquired by the detailed information acquisition means.

With this configuration, the user can acquire the detailed information about the introduced application program, using the metadata received together with the message from a partner user.

Further, the metadata storage means may store the metadata corresponding to the application program which has already been executed by the application execution means, and the selection means may allow the user to select, in accordance with the operation of the user, the metadata stored by the metadata storage means, the metadata corresponding to the application program which has already been executed by the application execution means.

With this configuration, the user can introduce to a partner user only the application program that the user has executed on the user's own information processing apparatus. Consequently, it is possible to maintain a high reliability of the introduction to a content (application program) between users.

Further, the information processing apparatus may further include execution history storage means for storing an execution history of the application program executed by the application execution means, and based on the execution history stored by the execution history storage means, the selection means may allow the user to select the metadata corresponding to the application program having the execution history.

With this configuration, the user can transmit to another information processing apparatus only the metadata corresponding to the application program executed on the user's own information processing apparatus and having the execution history, together with a message, such as an impression of executing the application. That is, the user can introduce to a partner user only the application program that the user has executed themselves. Consequently, it is possible to maintain a higher reliability of the introduction to a content (application program) between users.

Further, when the first storage section is mounted to the information processing apparatus, the metadata acquisition means may acquire the metadata stored in the first storage section, and may cause the metadata storage means to store the metadata.

With this configuration, it is possible to accumulate, in the metadata storage means included in the information processing apparatus, the metadata stored in the first storage section mounted to and then detached from the information processing apparatus. That is, it is possible to accumulate, in the metadata storage means included in the information processing apparatus, the metadata stored in the first storage section that has been mounted to the information processing apparatus at least once. Consequently, it is possible to introduce to the partner user the application program stored in the first storage section that has been mounted to the information processing apparatus at least once, together with a message.

Further, the detailed information may include guide information for the user to purchase the application program corresponding to the metadata received by the reception means.

With this configuration, the user can easily acquire the guide information for purchasing the application program introduced by the partner user.

Further, the information processing apparatus further includes: receiving means for receiving an input provided by the user to the metadata output by the information output means; and connection means for, when the receiving means has received the input provided by the user, connecting to a server through which the application program corresponding to the metadata is to be purchased.

With this configuration, the user can extremely easily connect to the server through which the application program introduced using the metadata by a partner user is to be purchased.

Further, based on the metadata output by the information output means, the connection means may connect to a site established in the server, on which the application program corresponding to the metadata is to be purchased.

With this configuration, the user can extremely easily connect to the site on which the application program introduced using the metadata by the partner user is to be purchased.

Further, the detailed information may include introduction information for introducing to the user the application program corresponding to the metadata received by the reception means.

With this configuration, the user can learn the content, the price, and the like of the application program introduced by the partner user.

Further, the detailed information acquisition means may acquire the detailed information from a server.

With this configuration, the user can acquire the detailed information about an application program that was unreleased and unfinished at the shipment of the information processing apparatus. Further, when the detailed information is updated, the user can acquire the latest introduction information.

Further, the guide information may guide the user to a purchase operation of the application program corresponding to the metadata received by the reception means, and the detailed information acquisition means may receive and acquire the detailed information from a server. The information processing apparatus may further include: purchase operation reception means for receiving the purchase operation performed by the user in accordance with the guide information; purchase request transmission means for transmitting to the server a purchase request for the application program of which the purchase operation has been received by the purchase operation reception means; and application reception means for receiving from the server the application program for which the purchase request has been made.

With this configuration, the user can easily and quickly purchase the application program in accordance with the guide information.

Further, the guide information may guide the user to a purchase operation of the application program corresponding to the metadata received by the reception means, and the detailed information acquisition means may receive and acquire the detailed information from a server. The information processing apparatus may further include: purchase operation reception means for receiving the purchase operation performed by the user in accordance with the guide information; purchase request transmission means for transmitting to the server a purchase request for the application program of which the purchase operation has been received by the purchase operation reception means; settlement-related information reception means for receiving, from the server, settlement-related information for guiding the user to an input operation of settlement information; settlement-related information output means for outputting the settlement-related information; settlement operation reception means for receiving the input of the settlement information provided by the user in accordance with the guide of the settlement-related information; settlement information transmission means for transmitting to the server the settlement information received by the settlement operation reception means; and application reception means for receiving from the server the application program for which the purchase request has been made.

With this configuration, the user can easily and quickly purchase the application program in accordance with the guide information and the settlement-related information.

Further, the metadata stored by the metadata storage means may include an icon representing the application program corresponding to the stored metadata, and the metadata received by the reception means may include an icon representing the application program corresponding to the received metadata.

With this configuration, the user can visually and intuitively recall the content of the introduced application program.

Further, the metadata stored by the metadata storage means may include a title of the application program corresponding to the stored metadata, and the metadata received by the reception means may include a title of the application program corresponding to the received metadata.

With this configuration, the user can easily recognize the content of the application.

Further, the information processing apparatus may further include transfer means for transferring the message and the metadata received by the reception means to a third information processing apparatus.

With this configuration, the user can easily introduce to another user an application program introduced by a partner user. Even in this case, only the application program that the user who has originally given the introduction at least had at hand, for example, through purchase is introduced to said another user by transfer. Consequently, even in this case, it is possible to maintain a high reliability of the introduction to a content (application program) between users.

Further, the information processing apparatus may further include: execution state determination means for determining whether or not a state of the application program executed by the application execution means has entered a predetermined state; and message acquisition means for, when it is determined that the execution state has entered the predetermined state, acquiring a message and the metadata that are related to the application program that is being executed, and the transmission means may transmit the message and the metadata acquired by the message acquisition means to said another information processing apparatus.

With this configuration, when the application has entered a predetermined state (for example, the user has completed a game), a message is presented to the user, in which metadata is automatically arranged. The user can transmit the message to another information processing apparatus. This enables the user to introduce the application program without inputting an introduction message or without effort.

The case described above is one where the technology presented herein is configured as an information processing apparatus. The present technology, however, may be configured as an information processing program, an information processing method, or an information processing system. Further, the present technology may be configured as a computer-readable storage medium having stored thereon the information processing program.

Based on the present technology, it is possible to maintain a high reliability of the introduction to a content (application program) between users.

These and other features, aspects and advantages of the present technology will become more apparent from the following detailed description of the present technology when taken in conjunction with the accompanying drawings.

BRIEF DESCRIPTION OF THE DRAWINGS

FIG. 17 is a flow chart showing an example of a predetermined game application process.

DESCRIPTION OF THE PREFERRED EMBODIMENTS

With reference to the drawings, an embodiment of is described. It should be noted that this embodiment does not limit the scope of the present technology in any way.

Figure 1:
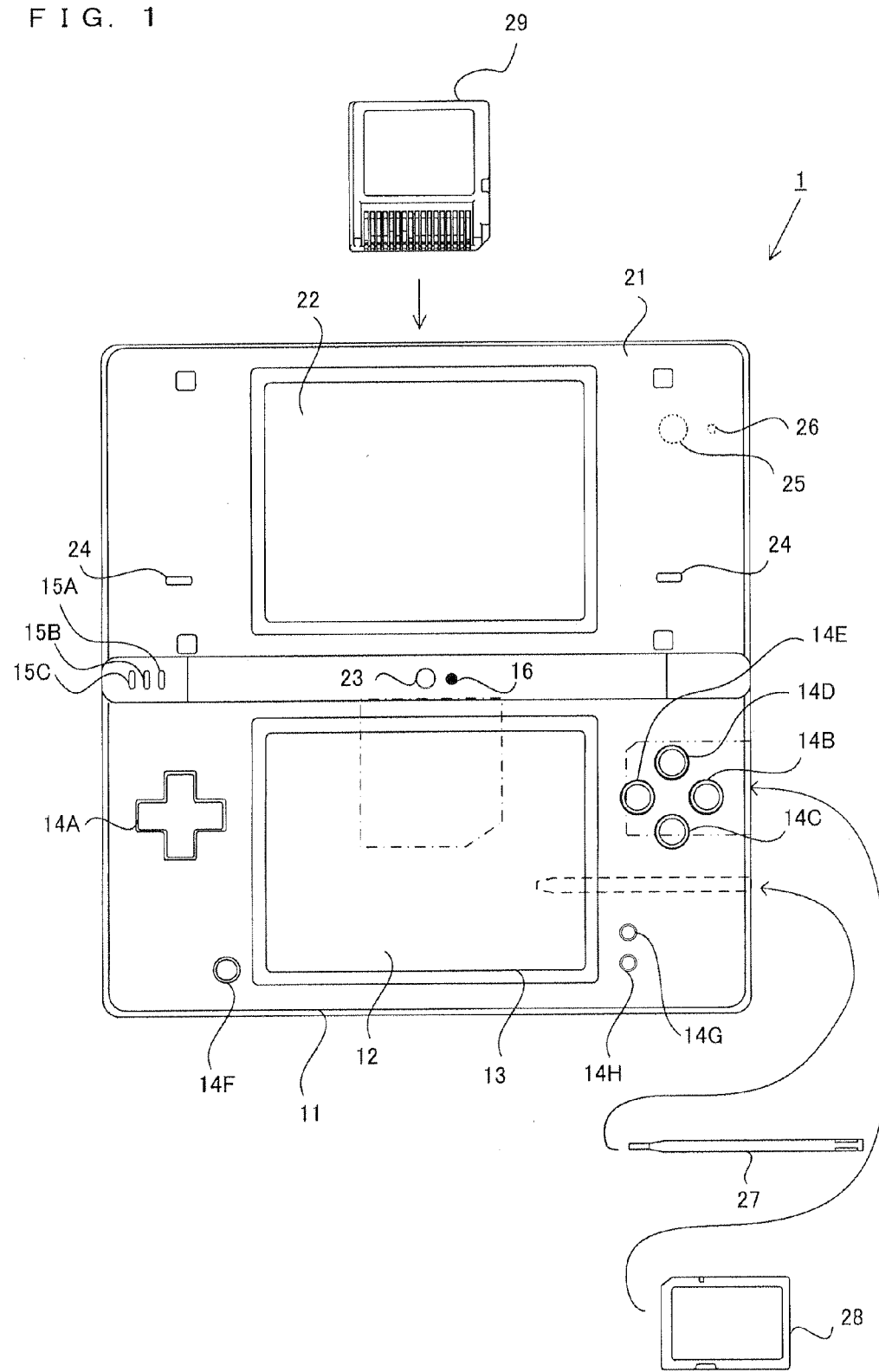
FIG. 1 is a schematic view of a game apparatus 1 included in a system according to an embodiment.

(Embodiment of the Present Technology)
[External Configuration of Game Apparatus]
FIG. 1 is a schematic view of a game apparatus 1 included in a system according to an embodiment. With reference to FIG. 1, a description is given below of the external configuration of the game apparatus 1, which is an example of an information processing apparatus according to the present embodiment.

Referring to FIG. 1, the game apparatus 1 is a foldable hand-held game apparatus, and is open (in an open state). The game apparatus 1 is of a size that allows a user to hold it with one hand or both hands even in the open state.

The game apparatus 1 includes a lower housing 11 and an upper housing 21. The lower housing 11 and the upper housing 21 are connected to each other by hinge so that the game apparatus 1 is openable and closable in a folding manner (foldable). In the example of FIG. 1, the lower housing 11 and the upper housing 21 each have a wider-than-high rectangular plate shape, and one of the long sides of the lower housing 11 and one of the long sides of the upper housing 21 are rotatably connected to each other. Normally, a user uses the game apparatus 1 in the open state. On the other hand, the user stores away the game apparatus 1 in a closed state when not using it.

The lower housing 11 includes a lower liquid crystal display (LCD) 12. The lower LCD 12 has a wider-than-high shape, and is located so that the direction along the long side of the lower LCD 12 coincides with the direction along the long side of the lower housing 11. In the present embodiment, a display device included in the game apparatus 1 is an LCD; however, the display device may be any other display device, such as a display device employing electroluminescence (EL).

The lower housing 11 includes operation buttons 14A to 14K and a touch panel 13 as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on the inner main surface of the lower housing 11, the inner main surface located inside the game apparatus 1 when the game apparatus 1 is folded. The direction input button 14A is used for, for example, a selection operation. The operation buttons 14B to 14E are used for, for example, a determination operation or a cancel operation. The power button 14F is used to power on/off the game apparatus 1. The start button 14G and the select button 14H are used to perform various operations on the game apparatus 1.

It should be noted that the operation buttons 14I to 14K are not shown in FIG. 1. For example, the L button 14I is provided at the left end of the upper side surface of the lower housing 11. The R button 14J is provided at the right end of the upper side surface of the lower housing 11. The L button 14I and the R button 14J are used to perform, for example, a capturing instruction operation (shutter operation) on the game apparatus 1. Additionally, the volume button 14K is provided on the left side surface of the lower housing 11. The volume button 14K is used to adjust the volume of speakers included in the game apparatus 1.

The game apparatus 1 further includes the touch panel 13 as an input device other than the operation buttons 14A to 14K. The touch panel 13 is mounted so as to cover the screen of the lower LCD 12. It should be noted that in the present embodiment, the touch panel 13 is, for example, a resistive touch panel. The touch panel 13, however, may be not only a resistive touch panel but also any pressure-type touch panel. In the present embodiment, the touch panel 13 has, for example, the same resolution (detection accuracy) as that of the lower LCD 12. Additionally, on the right side surface of the lower housing 11, an opening (a dashed line shown in FIG. 1) is provided. The opening can accommodate a stylus 27 used to perform an operation on the touch panel 13.

On the right side surface of the lower housing 11, an insertion slot (a dashed double-dotted line in FIG. 1) is provided for accommodating a memory card 28 (an example of a first storage section according to the present invention). Inside the insertion slot, a connector (not shown) is provided for electrically connecting the game apparatus 1 and the memory card 28. The memory card 28 is, for example, a secure digital (SD) memory card, and is detachably attached to the connector. The memory card 28 is used to, for example, store (save) an image captured by the game apparatus 1 or load an image generated by another apparatus into the game apparatus 1.

On the upper side surface of the lower housing 11, an insertion slot (a dashed dotted line in FIG. 1) is provided for accommodating a cartridge 29 (an example of the first storage section according to the present invention). Also inside the insertion slot, a connector (not shown) is provided for electrically connecting the game apparatus 1 and the cartridge 29. The cartridge 29 is a storage medium having stored therein a game program or the like, and is detachably inserted into the insertion slot provided in the lower housing 11.

At the left of the connecting part between the lower housing 11 and the upper housing 21, three LEDs 15A to 15C are provided. Here, the game apparatus 1 can wirelessly communicate with another apparatus. The first LED 15A is lit when the power to the game apparatus 1 is on. The second LED 15B is lit while the game apparatus 1 is being charged. The third LED 15C is lit when wireless communication is established. Thus, the three LEDs 15A to 15C can notify the user of the on/off state of the power to the game apparatus 1, the state of the charge, and the state of the establishment of communication.

On the other hand, the upper housing 21 includes an upper LCD 22. The upper LCD 22 has a wider-than-high shape, and is located so that the direction along the long side of the upper LCD 22 coincides with the direction along the long side of the upper housing 21. It should be noted that as in the lower LCD 12, a display device employing any other method (and having any resolution) may be used instead of the upper LCD 22. On the upper LCD 22, for example, an operation instruction screen is displayed to inform the user of the functions of the operation buttons 14A to 14K and the touch panel 13.

The upper housing 21 includes two cameras (an inner camera 23 and an outer camera 25). As shown in FIG. 1, the inner camera 23 is provided on the inner main surface of the upper housing 21 near the connecting part. On the other hand, the outer camera 25 is provided on the surface opposite to the inner main surface of the upper housing 21, on which the inner camera 23 is provided. That is, the outer camera 25 is provided on the outer main surface (which faces outward when the game apparatus 1 is closed and which corresponds to the back surface of the upper housing 21 shown in FIG. 1) of the upper housing 21. It should be noted that in FIG. 1, the outer camera 25 is shown by a dotted line. This enables the inner camera 23 to perform capturing in the direction that the inner main surface of the upper housing 21 faces, and enables the outer camera 25 to perform capturing in the direction opposite to the capturing direction of the inner camera 23, that is, in the direction that the outer main surface of the upper housing 21 faces.

It should be noted that on the inner main surface near the connecting part, a microphone (a microphone 41 shown in FIG. 2) is provided as an audio input device. Further, on the inner main surface near the connecting part, a microphone hole 16 is formed so as to detect a sound from outside the game apparatus 1.

On the outer main surface of the upper housing 21, a fourth LED 26 (a dotted line shown in FIG. 1) is provided. The fourth LED 26 is lit when capturing has been performed by the outer camera 25 (when a shutter button has been pressed). Further, the fourth LED 26 is lit while a moving image is being captured by the outer camera 25. The fourth LED 26 can notify a person to be captured or another person around the person to be captured that capturing has been performed (is being performed) by the game apparatus 1.

On the inner main surface of the upper housing 21, sound holes 24 are formed to the right and left, respectively, of the upper LCD 22, provided near the center of the inner main surface. In the upper housing 21, speakers are provided at the back of the sound holes 24. The sound holes 24 are provided so as to release a sound output by the speakers to the outside of the game apparatus 1.

As described above, the upper housing 21 includes the inner camera 23 and the outer camera 25 for capturing an image, and also includes the upper LCD 22, which is display means for displaying, for example, an operation instruction screen when capturing is performed. On the other hand, the lower housing 11 includes the input devices (the touch panel 13 and the buttons 14A to 14K) for providing an operation input to the game apparatus 1, and also includes the lower LCD 12, which is display means for displaying a game screen. Thus, when using the game apparatus 1, the user can provide an input to the input devices, holding the lower housing 11 while viewing a captured image (an image captured by one of the cameras) displayed on the lower LCD 12.

[Internal Configuration of Game Apparatus]

Figure 2:
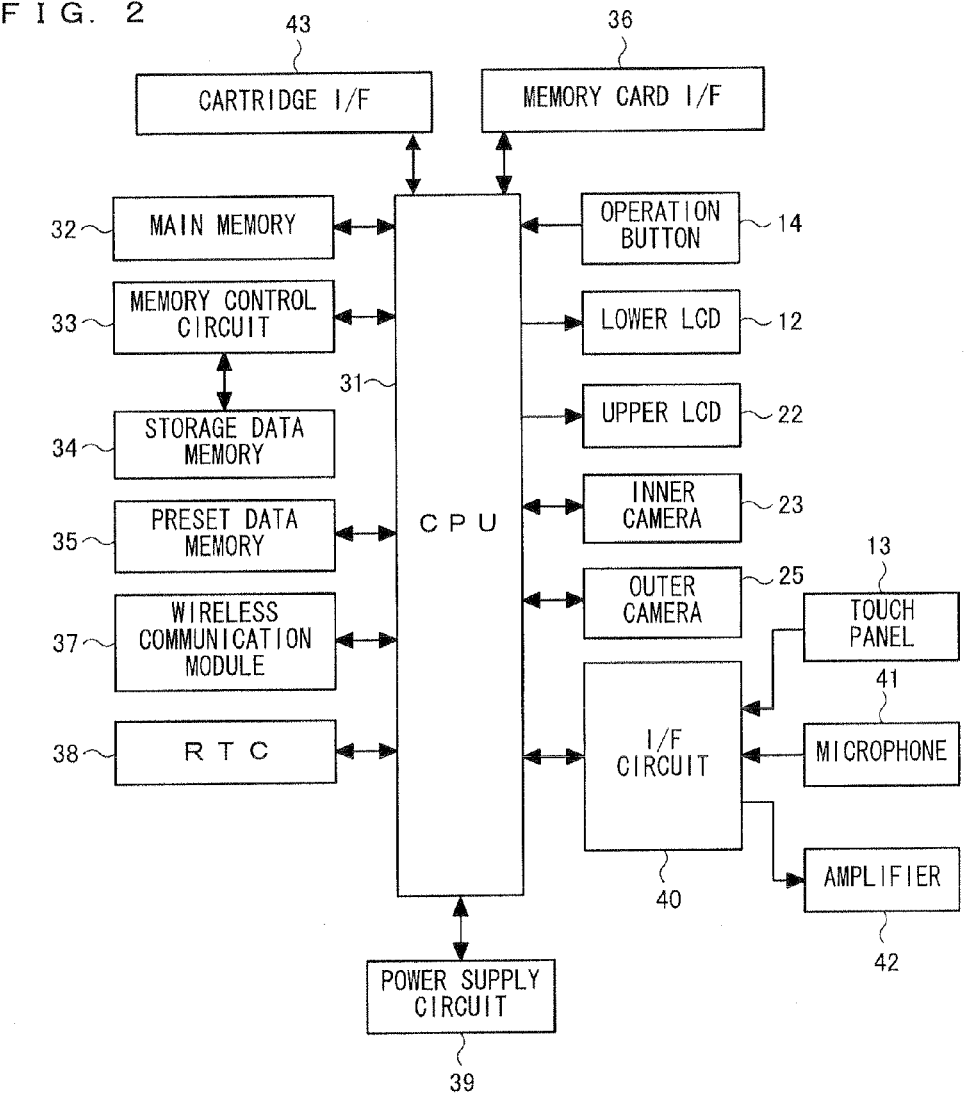
FIG. 2 is a block diagram showing an example of the internal configuration of the game apparatus 1.

FIG. 2 is a block diagram showing an example of the internal configuration of the game apparatus 1. With reference to FIG. 2, a description is given below of the internal configuration of the game apparatus 1.

As shown in FIG. 2, the game apparatus 1 includes electronic components, such as a central processing unit (CPU) 31, a main memory 32, a memory control circuit 33, a storage data memory 34 (an example of a second storage section according to the present invention), a preset data memory 35, a memory card interface (memory card I/F) 36, a cartridge I/F 43, a wireless communication module 37, a real time clock (RTC) 38, a power supply circuit 39, and an interface circuit (I/F circuit) 40. These electronic components are mounted on an electronic circuit board, and the board is accommodated in the lower housing 11 (or may be accommodated in the upper housing 21).

The CPU 31 is information processing means for executing a predetermined program. In the present embodiment, the predetermined program is stored in a memory (the storage data memory 34) included in the game apparatus 1, the memory card 28, or the cartridge 29. The CPU 31 executes the predetermined program, and thereby performs a main process and the like described later.

It should be noted that although described later, in the present embodiment, a program to be executed by the CPU 31 may be stored in advance in a memory included in the game apparatus 1, or may be acquired from the memory card 28 and/or the cartridge 29, or may be acquired from another apparatus by communication therewith. For example, the program may be acquired by downloading it from a predetermined server via the Internet, or may be acquired by downloading a predetermined program from a stationary game apparatus by communication therewith.

The main memory 32, the memory control circuit 33, and the preset data memory 35 are connected to the CPU 31. Additionally, the storage data memory 34 is connected to the memory control circuit 33. The main memory 32 is storage means used as a work area or a buffer area of the CPU 31. That is, the main memory 32 stores various types of data used for processes performed by the CPU 31, and also stores a program acquired from outside (for example, the memory card 28, the cartridge 29, or another apparatus) the game apparatus 1. In the present embodiment, the main memory 32 is, for example, a pseudo-SRAM (PSRAM). The storage data memory 34 is storage means for storing a program to be executed by the CPU 31, data of an image captured by the inner camera 23 or the outer camera 25, and the like. The storage data memory 34 is composed of a non-volatile storage medium, and in the present embodiment, is composed of, for example, a NAND flash memory. In accordance with an instruction from the CPU 31, the memory control circuit 33 controls the reading/writing of data from/into the storage data memory 34. The preset data memory 35 is storage means for storing data (preset data), such as various parameters set in advance in the game apparatus 1. The preset data memory 35 may be a flash memory that can be connected to the CPU 31 via a serial peripheral interface (SPI) bus.

The memory card I/F 36 is connected to the CPU 31. In accordance with an instruction from the CPU 31, the memory card I/F 36 reads/writes data from/into the memory card 28 connected to the connector.

The cartridge I/F 43 is connected to the CPU 31. In accordance with an instruction from the CPU 31, the cartridge I/F 43 reads/writes data from/into the cartridge 29 connected to the connector. In the present embodiment, for example, an application program is read from the cartridge 29 and is executed by the CPU 31, and data about the application program (for example, data saved as a result of playing a game) is written into the cartridge 29. It should be noted that the application program may be hereinafter referred to as an "application".

The wireless communication module 37 has the function of connecting to a wireless LAN by, for example, a method based on the IEEE 802.11b/g standard. The wireless communication module 37 is connected to the CPU 31. The CPU 31 can transmit/receive data to/from another apparatus via the Internet, or not via the Internet, using the wireless communication module 37.

The wireless communication module 37 has the function of wirelessly communicating with a game apparatus of the same type as the game apparatus 1 by a predetermined communication method. Here, the radio waves used in this wireless communication are, for example, weak radio waves, the use of which does not require a radio station license. For example, the wireless communication module 37 performs Near Field Communication of which the data transmission distance is within the range of 10 m. Accordingly, the CPU 31 can transmit/receive data to/from another game apparatus 1 when the CPU 31 is placed within the communication range of said another game apparatus 1 (for example, when the distance between the apparatuses is 10 m or less). The data transmission/reception is performed when an instruction is received from the user (local communication), and is also automatically repeated at predetermined time intervals without an instruction from the user. That is, the CPU 31 searches for another game apparatus 1 present within the communication range of the CPU 31. Then, the CPU 31 automatically establishes communication with another game apparatus 1 found as a result of the search, and automatically transmits/receives data to/from said another game apparatus 1. After the communication is completed, the CPU 31 automatically disconnects the communication. Such a series of processing is repeated at predetermined time intervals. Hereinafter, this type of communication is referred to as "passing communication", and a process of performing passing communication is referred to as a "passing communication process". It should be noted that details of the "passing communication process" are described later with reference to FIG. 14.

The RTC 38 and the power supply circuit 39 are connected to the CPU 31. The RTC 38 counts time and outputs the counted time to the CPU 31. For example, the CPU 31 can also calculate the current time (date and time) or the like based on the counted time. The power supply circuit 39 controls the power supplied from a power source (which is typically a battery and is accommodated in the lower housing 11) included in the game apparatus 1, and supplies power to each component of the game apparatus 1.

The game apparatus 1 includes a microphone 41 and an amplifier 42. The microphone 41 and the amplifier 42 are each connected to the I/F circuit 40. The microphone 41 detects a sound produced toward the game apparatus 1 by the user, and outputs to the I/F circuit 40 an audio signal representing the sound. The amplifier 42 amplifies the audio signal from the I/F circuit 40, and outputs the amplified audio signal through the speakers (not shown). The I/F circuit 40 is connected to the CPU 31.

The touch panel 13 is connected to the I/F circuit 40. The I/F circuit 40 includes an audio control circuit for controlling the microphone 41 and the amplifier 42 (the speakers), and a touch panel control circuit for controlling the touch panel 13. The audio control circuit performs A/D conversion and D/A conversion on an audio signal, and converts an audio signal into audio data in a predetermined format. The touch panel control circuit generates touch position data in a predetermined format, based on a signal from the touch panel 13, and outputs the touch position data to the CPU 31. For example, the touch position data represents the coordinates of the position, on the input surface of the touch panel 13, at which an input has been provided. The touch panel control circuit reads a signal from the touch panel 13 and generates touch position data, once in a predetermined period of time. The CPU 31 acquires touch position data from the I/F circuit 40, and therefore can recognize the position at which an input has been provided on the touch panel 13.

An operation button 14 includes the operation buttons 14A to 14K described above, and is connected to the CPU 31. The operation button 14 outputs operation data to the CPU 31, the operation data representing the states of inputs provided to the operation buttons 14A to 14K (indicating whether or not the operation buttons have been pressed), respectively. The CPU 31 acquires the operation data from the operation button 14, and thereby performs processes based on the inputs provided to the operation button 14.

The inner camera 23 and the outer camera 25 are connected to the CPU 31. The inner camera 23 and the outer camera 25 each capture an image in accordance with an instruction from the CPU 31, and output data of the captured image to the CPU 31.

The lower LCD 12 and the upper LCD 22 are connected to the CPU 31. The lower LCD 12 and the upper LCD 22 each display an image in accordance with an instruction from the CPU 31.

[System According to the Present Embodiment]

Figure 3:
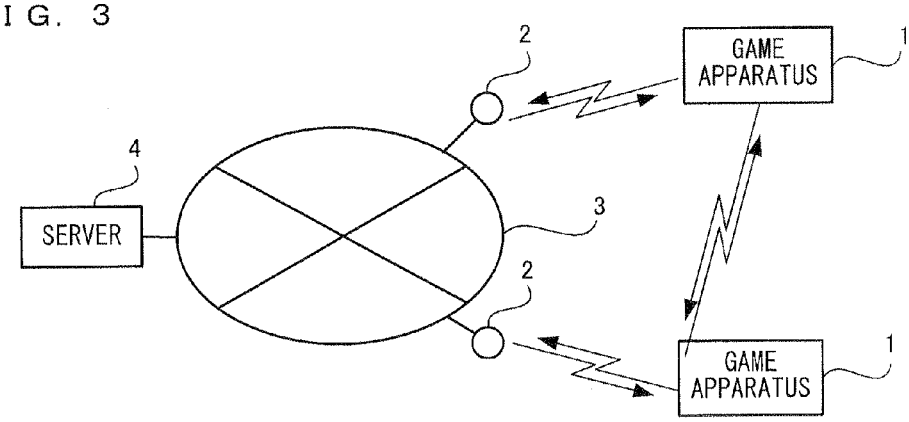
FIG. 3 is a diagram showing an example of the system according to the embodiment.

FIG. 3 shows an example of the system according to the present embodiment. As shown in FIG. 3, the system according to the present embodiment includes a plurality of game apparatuses 1 and a server 4 communicably connected to the plurality of game apparatuses 1 via access points 2 and a network 3. The plurality of game apparatuses 1 communicate with each other via the server 4 or the network 3, or directly communicate with each other not via the server 4 or the network 3 (for example, by local communication or passing communication).

It should be noted that FIG. 3 shows only two game apparatuses 1. The system according to the present embodiment, however, may include three or more game apparatuses 1. Further, the system according to the present embodiment may include a plurality of servers 4. It should be noted that the network 3 is a wired or wireless network, such as the Internet, WAN, or LAN.

[Internal Configuration of Server]

Figure 4:
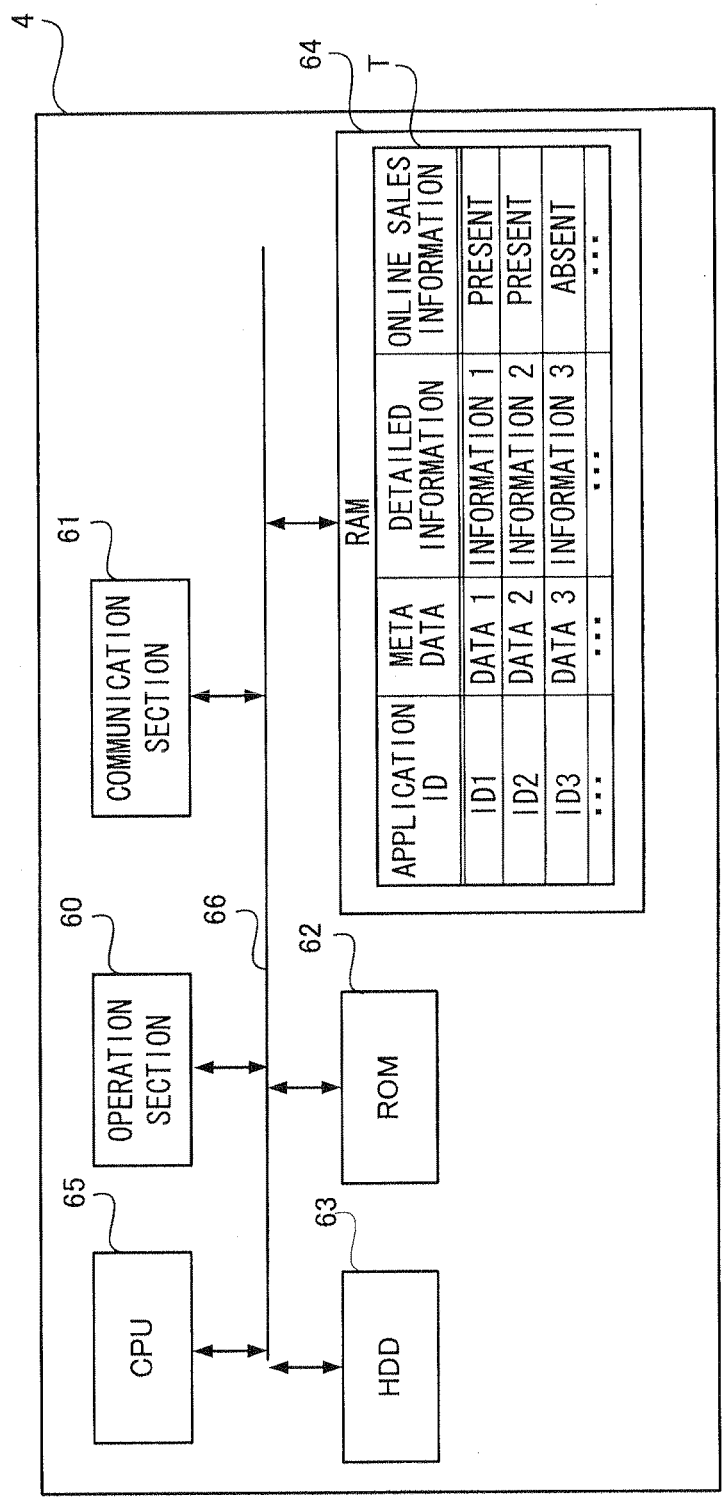
FIG. 4 is a block diagram showing an example of the internal configuration of a server 4 included in the system according to the embodiment.

FIG. 4 is a block diagram showing an example of the internal configuration of the server 4 included in the system according to the present embodiment. As shown in FIG. 4, the server 4 includes an operation section 60, a communication section 61, a ROM 62, an HDD 63, a RAM 64, and a CPU 65, which are communicably connected to one another via a bus 66.

The operation section 60 has the function of receiving an operation performed by the administrator of the server 4. The communication section 61 has the function of communicating with another apparatus via the network 3. The ROM 62 stores a system program for starting the server 4 and realizing basic functions of the server 4. The HDD 63 stores programs including a communication program for allowing the server 4 to communicate with the game apparatuses 1, and stores data necessary for executing the programs. The data includes detailed information and the like to be downloaded by (distributed to) the game apparatuses 1. The RAM 64 acts as a work area of the CPU 65, and stores a table T read from the HDD 63. In the table T, the following are registered in association with one another: application IDs; metadata corresponding to the applications represented by the application IDs; detailed information about the applications represented by the application IDs; and online sales information. Here, although described later with reference to FIG. 7 (1), the metadata is information about the applications, such as icons representing the applications and titles of the applications. The detailed information is detailed information about the applications represented by the corresponding application IDs, such as information representing the contents and the prices of the applications. The online sales information indicates whether or not the applications are sold (distributed) online through the server 4.

In response to a distribution request for detailed information from a game apparatus 1, the CPU 65 searches the table T using the metadata included in the request. The CPU 65 reads detailed information associated with the metadata, and transmits the detailed information to the game apparatus 1.

[Outline of Processing Executed by Game Apparatus]

A description is given below of an outline of processing executed by a game apparatus 1. Applications executed by the game apparatus 1 are classified into a built-in application, a card application, and a download application (hereinafter referred to as a "DL application").

The built-in application is stored in advance in the game apparatus 1 at the shipment of the game apparatus 1 from the manufacturer (or upon release of the game apparatus 1). The DL application is downloaded from outside the game apparatus 1 (typically, the server 4) in a wired or wireless manner. When the built-in application or the DL application is initially executed by the game apparatus 1, the game apparatus 1 registers (stores) the metadata of the built-in application or the DL application.

The card application is stored in the cartridge 29 or the memory card 28 (see FIG. 1). When the cartridge 29 is initially inserted into the corresponding insertion slot (indicated by the dashed-dotted line in FIG. 1) of the game apparatus 1, or when the memory card 28 is initially inserted into the corresponding insertion slot (indicated by the dashed double-dotted line in FIG. 1) of the game apparatus 1, the game apparatus 1 stores the card application stored in the cartridge 29 or the memory card 28, and registers the metadata of the card application. It should be noted that in the following descriptions, only the application stored in the cartridge 29 is described as the card application, while the application stored in the memory card 28 is not described, for ease of description. The present invention, however, is also similarly applicable to the application stored in the memory card 28.

When the game apparatus 1 has executed the built-in application, the card application, or the DL application, the game apparatus 1 stores the history of the executed application (hereinafter referred to as a "play history").

That is, when the game apparatus 1 executes, or has become capable of executing, an application, the game apparatus 1 registers the metadata of the application, and stores the play history of the application if the application is executed. Details of this process are described later with reference to FIG. 10.

Further, the game apparatus 1 transmits/receives a message created by the user to/from another game apparatus 1 by a message application process described later with reference to FIG. 15. During the process, in accordance with an instruction from the user, the game apparatus 1 can paste in the message the metadata of an application (typically, an icon for, or a title of, the application) whose play history is stored, and transmit the result. The game apparatus 1 can also receive from the user of the partner game apparatus 1 a message in which metadata is pasted in a similar manner. The transmission and reception of the messages are performed by communication via the server 4, local communication, or passing communication. When having received from the partner game apparatus 1 the message in which metadata is pasted, the game apparatus 1 connects to the server 4, and acquires and displays the detailed information about the application associated with the metadata, in accordance with an instruction from the user. Thereafter, when the user has viewed the detailed information and performed a purchase operation of (acquiring) the application, the game apparatus 1 downloads the application from the server 4.

As described above, the user of the game apparatus 1 can introduce to the user of another game apparatus 1 an application that has been, for example, purchased, stored in a storage area of the own apparatus (including a storage area of the cartridge 29 or the memory card 28 accommodated in the own apparatus), and played, together with a message, such as an impression of playing the application. In other words, the user of said another game apparatus 1 to which the application is introduced receives an introduction to the application together with the impression or the like from the user who has actually played the application. Consequently, based on the present embodiment, it is possible to maintain a high reliability of the introduction to a content (article) between users.

[Memory Map of Storage Data Memory]

Figure 5:
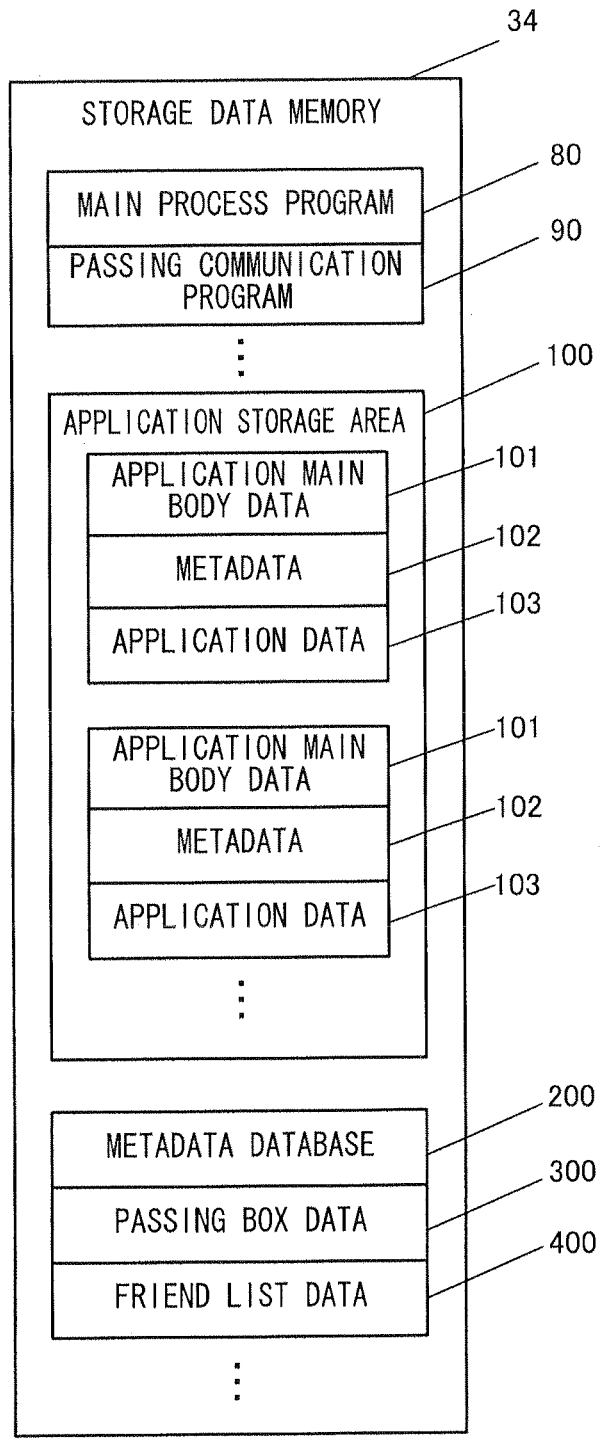
FIG. 5 is a diagram showing an example of a memory map of a storage data memory 34.
Figure 6:
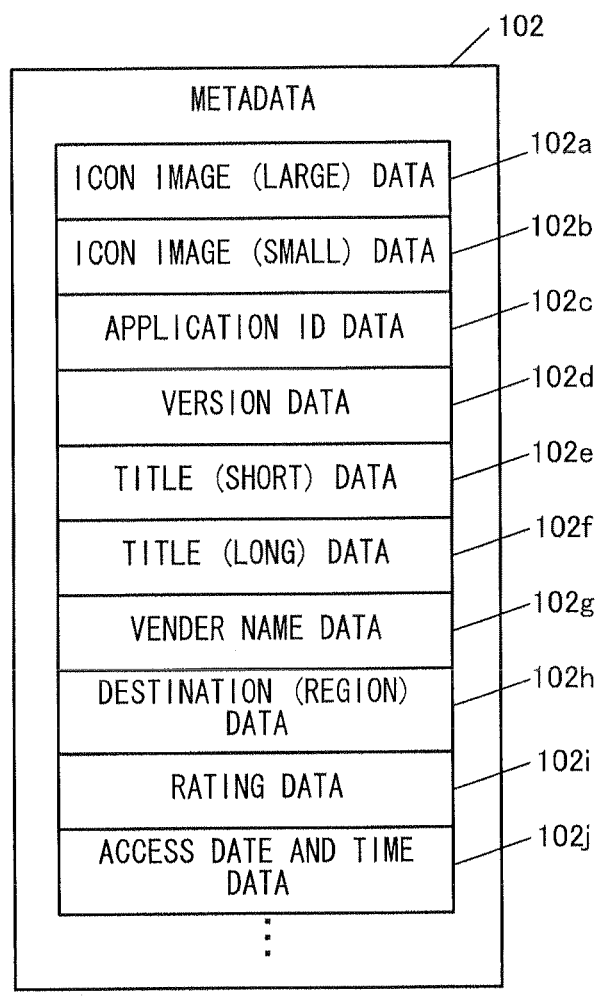
FIG. 6 is a diagram showing an example of metadata stored in the storage data memory 34.

Next, a description is given of details of the processing executed by the game apparatus 1. First, with reference to FIGS. 5 to 9, a description is given of data stored in the storage data memory 34. FIG. 5 is a diagram showing an example of a memory map of the storage data memory 34 of the game apparatus 1. As shown in FIG. 5, the storage data memory 34 stores various programs, such as a main process program 80 and a passing communication program 90. Further, the storage data memory 34 includes an application storage area 100, in which application main body data 101, metadata 102, and application data 103 are stored as a set for each application. The storage data memory 34 also stores various types of data, such as a metadata database 200, passing box data 300, and friend list data 400.

It should be noted that the application main body data 101 and the metadata 102 of the built-in application is already stored in the storage data memory 34 at the shipment from the manufacturer. Further, the application main body data 101 and the metadata 102 of the DL application is stored in the storage data memory 34 when these pieces of data have been downloaded. Furthermore, the application main body data 101 and the metadata 102 of the card application is stored in the storage data memory 34 when the cartridge 29 (or the memory card 28) has been inserted (mounted) into the game apparatus 1.

When having executed each application, the CPU 31 loads the data (including the applications and the programs) stored in the storage data memory 34 into the main memory 32 for use where necessary, and stores or overwrites the data where necessary. With this, the CPU 31 performs the process of each application using the data loaded into the main memory 32. It should be noted that the configuration may be such that the application main body data 101 and the metadata 102 of the card application is not stored in the storage data memory 34, and the CPU 31 may load the application main body data 101 and the metadata 102 from the cartridge 29 (or the memory card 28) directly into the main memory 32, and perform the process.

The main process program 80 is designed to realize the main process described later with reference to FIG. 10.

The passing communication program 90 is designed to realize the passing communication process described later with reference to FIG. 14.

The application main body data 101 is main body data of an application. The application main body data 101 is main body data of, for example, a message application described later with reference to FIG. 15 and various game applications.

The metadata 102 represents information about the application represented by the corresponding application main body data 101. The metadata 102 is described in detail below with reference to FIG. 6. The metadata 102 includes icon image (large) data 102a, icon image (small) data 102b, application ID data 102c, version data 102d, title (short) data 102e, title (long) data 102f, vendor name data 102g, destination (region) data h, rating data 102i, access date and time data 102j, and the like.

The icon image (large) data 102a is image data visually representing the application and having a relatively large size. The icon image (small) data 102b is image data visually representing the application and having a relatively small size. The application ID data 102c represents an identifier unique to the application. The version data 102d represents a version of the application. The title (short) data 102e represents a relatively short title (for example, an abbreviated title) of the application. The title (long) data 102f represents a relatively long title (for example, a full title) of the application. The vendor name data 102g represents the name of the vender of the application. The destination (region) data 102h represents the destination of the application. The rating data 102i represents the rating of the application, and is, for example, data indicating that minors cannot use the application. The access date and time data 102j represents the date and time of access to the application.

The application data 103 is data used for the corresponding application. The application data 103 is described in detail below with reference to FIG. 7.

Figure 7:
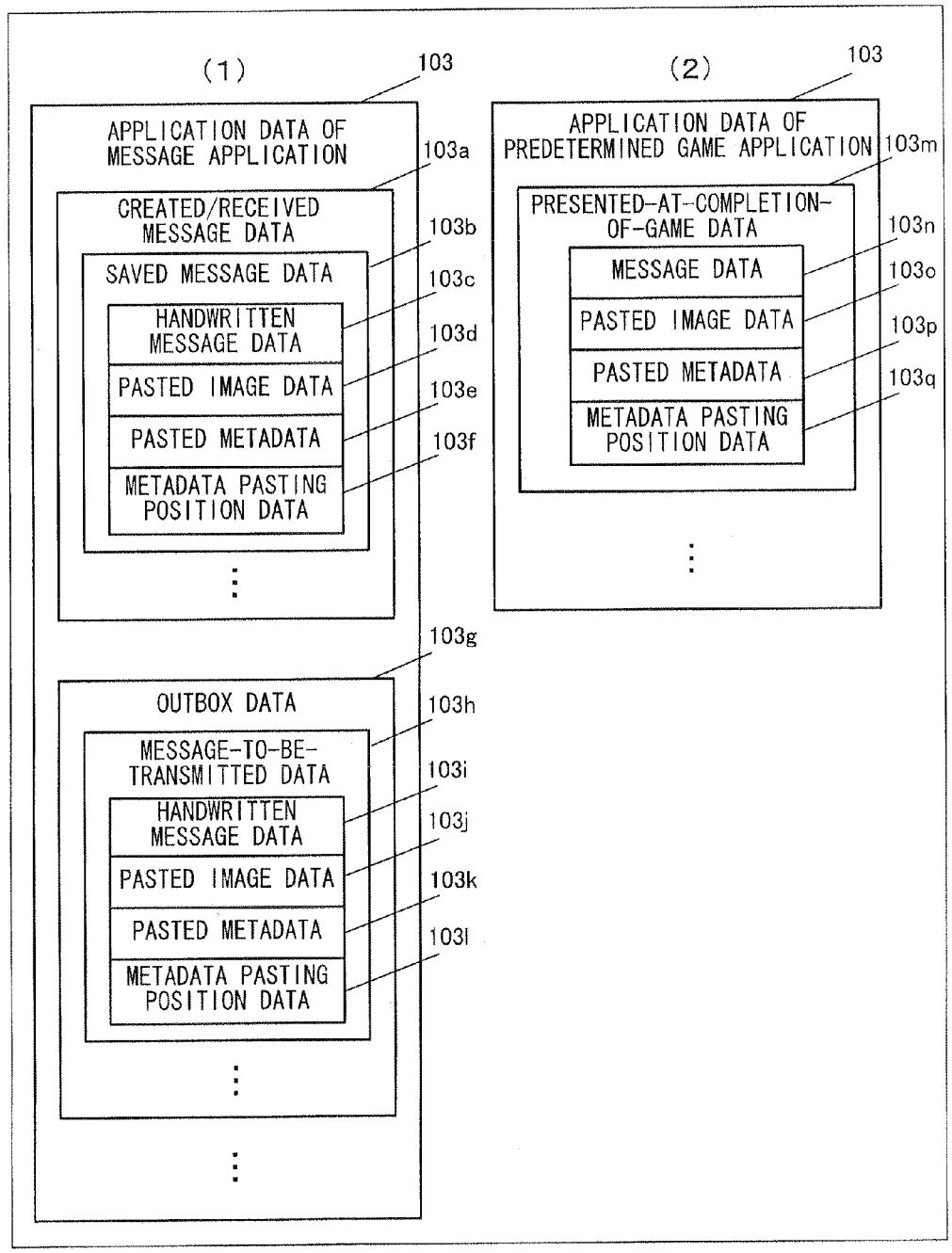
FIG. 7 is a diagram showing an example of application data 103 stored in the storage data memory 34.

FIG. 7 (1) is a diagram showing the application data 103 of a message application. It should be noted that although described later with reference to FIG. 15 and the like, the message application is one where the game apparatus 1, for example, transmits/receives a message to/from another game apparatus 1.

The application data 103 of the message application includes created/received message data 103a and outbox data 103g.

The created/received message data 103a is saved data including data of a message created by the user, and data of a message received from another game apparatus 1. FIG. 7 (1) shows only one of the pieces of data of these messages as the saved message data 103b, for ease of description.

The saved message data 103b includes handwritten message data 103c, pasted image data 103d, pasted metadata 103e, and metadata pasting position data 103f. The handwritten message data 103c is data of a handwritten message written on the touch panel 13 by the user using the stylus 27 or the like. The pasted image data 103d is image data pasted in the handwritten message, and is, for example, data of an image captured by the inner camera 23 or the outer camera 25. It should be noted that the pasted image data 103d may include data representing the position of the image data pasted in the handwritten message. The pasted metadata 103e is metadata pasted in the handwritten message, and is typically icon image data of the application, or title data of the application. The metadata pasting position data 103f represents the position of the metadata pasted in the handwritten message.

The outbox data 103g is copied from the saved message data 103b in order to be transmitted (or transferred) to another game apparatus 1, and is temporarily stored until transmitted. FIG. 7 (1) shows only one of the pieces of data as message-to-be-transmitted data 103h, for ease of description.

The message-to-be-transmitted data 103h is copied from the saved message data 103b in order to be transmitted to another game apparatus 1, and includes handwritten message data 103i, pasted image data 103j, pasted metadata 103k, and metadata pasting position data 103l. The handwritten message data 103i is copied from the handwritten message data 103c. The pasted image data 103j is copied from the pasted image data 103d. The pasted metadata 103k is copied from the pasted metadata 103e. The metadata pasting position data 103l is copied from the metadata pasting position data 103f.

FIG. 7 (2) is a diagram showing the application data 103 of a predetermined game application. It should be noted that although described later with reference to FIG. 17, examples of the predetermined game application include various game applications, such as a racing game application, a combat game application, a puzzle game application, and a sports game application.

The application data 103 of the predetermined game application includes presented-at-completion-of-game data 103m presented to the user when the user has completed a game of the game application. The presented-at-completion-of-game data 103m includes message data 103n, pasted image data 103o, pasted metadata 103p, and metadata pasting position data 103q. The message data 103n is data of a message presented to the user when the user has completed the game of the game application, and is typically data of a message that commends and certifies the completion of the game. The pasted image data 103o is data of an image pasted in the message, and is data stored in advance, or data of an image of the user, for example, captured by the inner camera 23 when they have completed the game. It should be noted that the pasted image data 103o may include data representing the position of the image data pasted in the message. The pasted metadata 103p is the metadata of the game application pasted in the message, the game of the game application having been completed by the user, and is, for example, icon image data of the application, or title data of the application. The metadata pasting position data 103q represents the position of the metadata pasted in the message. It should be noted that FIG. 7 (2) shows one piece (one type) of presented-at-completion-of-game data 103m; however, a plurality of types of the presented-at-completion-of-game data 103m may be prepared.

Figure 8:
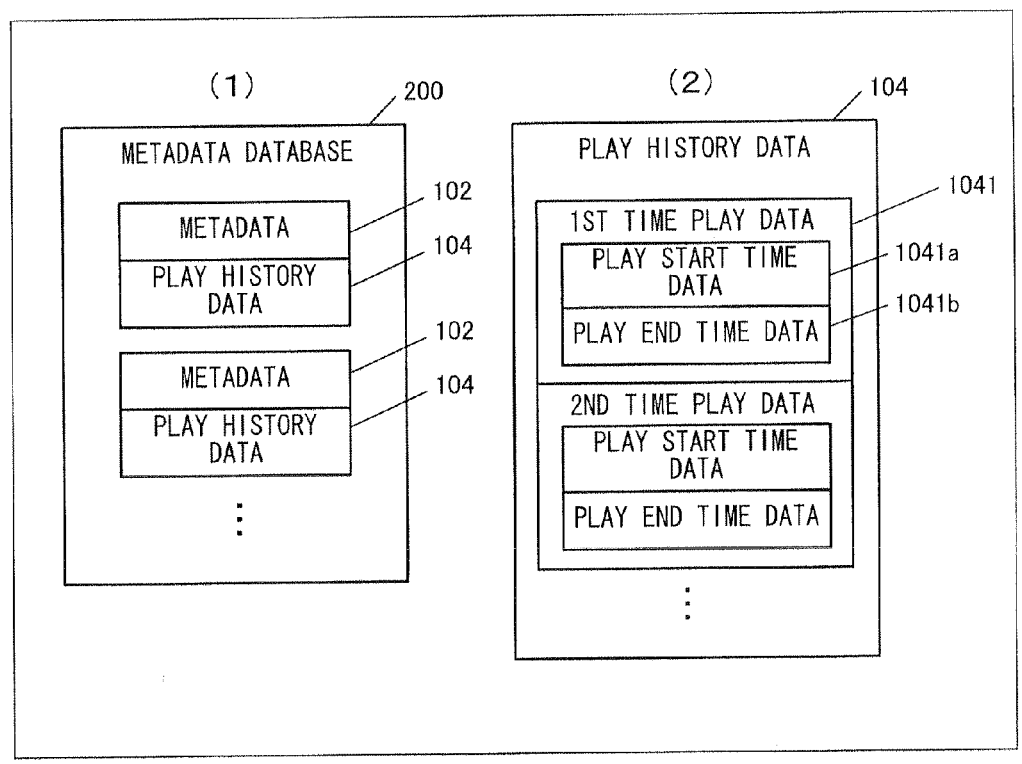
FIG. 8 is a diagram showing an example of metadata database 200 stored in the storage data memory 34.

The metadata database 200 is a database of the metadata 102. As shown in FIG. 8 (1), the metadata database 200 stores: the metadata 102 of each application which has been executed by the game apparatus 1, or of which the execution has been prepared by the game apparatus 1 (specifically, the cartridge 29 or the like has been inserted into the game apparatus 1); and play history data 104 storing the play history of the application. As shown in FIG. 8 (2), the play history data 104 stores play data 1041 of each play. The play data 1041 of each play includes play start time data 1041a representing the date and time of the start of the play, and play end time data 1041b representing the date and time of the end of the play.

Figure 9:
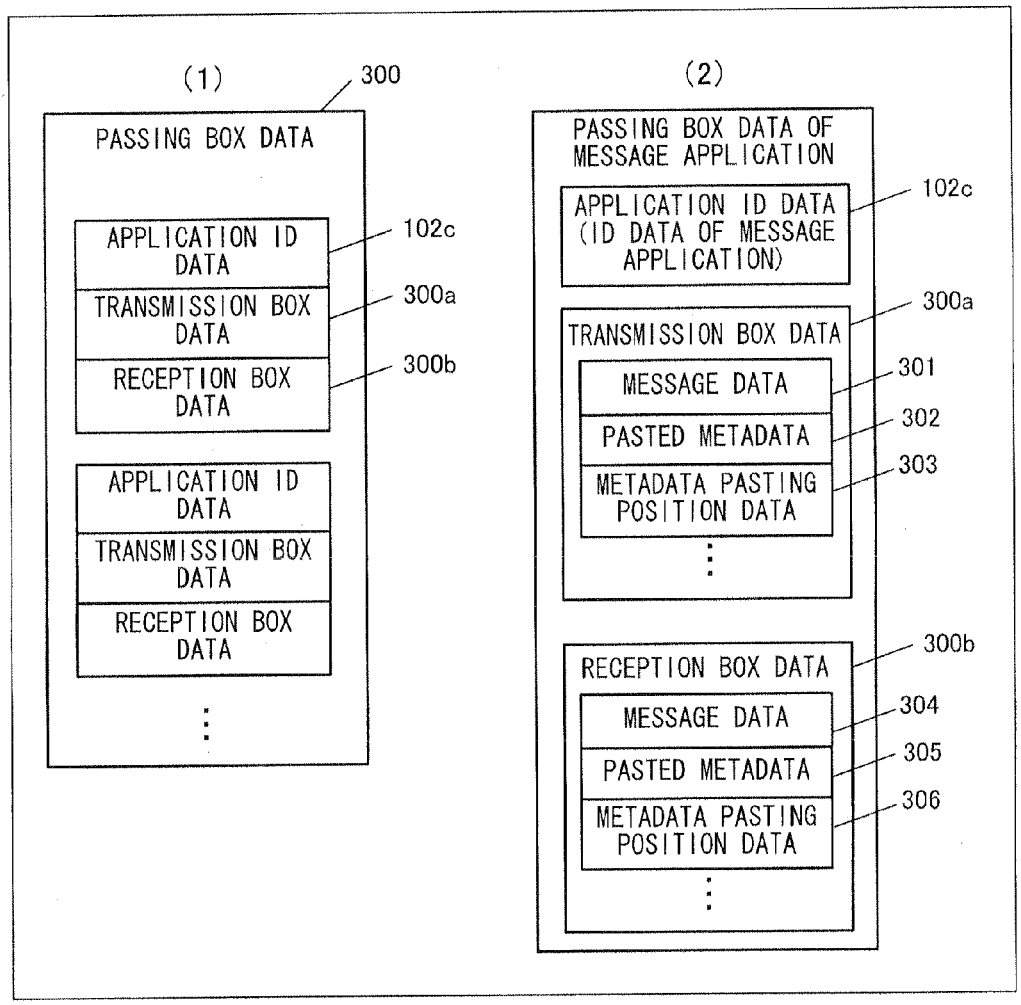
FIG. 9 is a diagram showing an example of passing box data 300 stored in the storage data memory 34.

As shown in FIG. 9 (1), the passing box data 300 includes application ID data 102c, transmission box data 300a, and reception box data 300b, which are arranged as a set for each application executable by the game apparatus 1 (in the present embodiment, the applications stored in the application storage area 100). The transmission box data 300a is transmission information to be transmitted to another game apparatus 1 by the passing communication process of FIG. 14. The reception box data 300b is reception information received from another game apparatus 1 by the passing communication process of FIG. 14. It should be noted that the transmission information and the reception information are set for each application.

A description is given below of the passing box data of the message application described later with reference to FIG. 15. As shown in FIG. 9 (2), the passing box data of the message application includes: the ID data 102c of the message application; the transmission box data 300a including message data 301 to be transmitted to another game apparatus 1, pasted metadata 302, and metadata pasting position data 303; and the transmission box data 300b including message data 304 received from another game apparatus 1, pasted metadata 305, and metadata pasting position data 306.

Friend list data 400 is list data of friend codes representing other game apparatuses 1 of friends, respectively, registered by a predetermined process in accordance with an operation of the user.

[Main Process]

Figure 10:
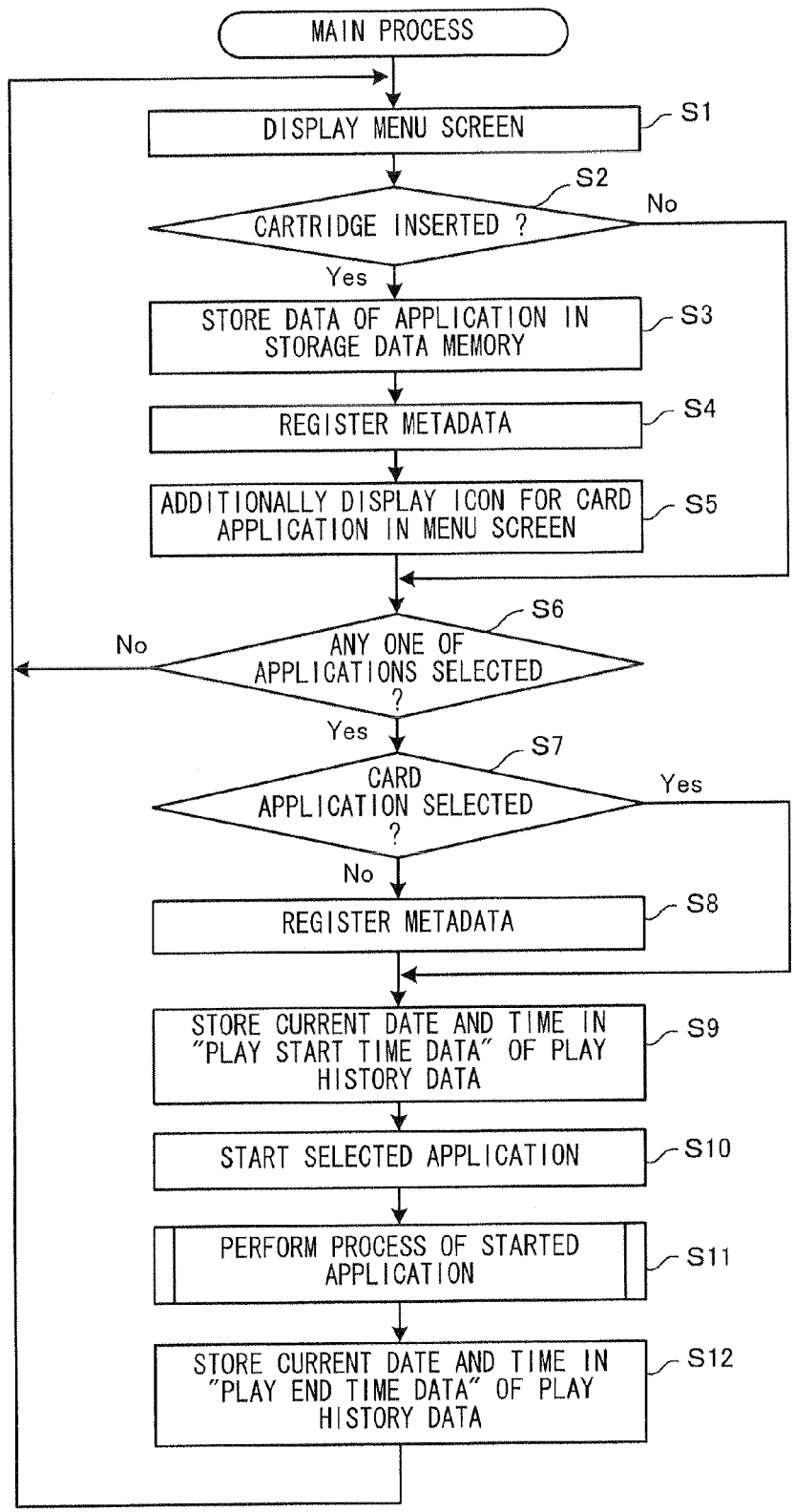
FIG. 10 is a flow chart showing an example of a main process.

Next, with reference to FIG. 10, a description is given of a process performed by the CPU 31 based on the main process program 80. FIG. 10 is a flow chart showing an example of a main process. It should be noted that the process of the flow chart of FIG. 10 is repeated at predetermined time intervals, except the case where an application is being executed in step S11, and thereby the main process proceeds. Further, in all the drawings to be referred to hereinafter, the steps performed by the CPU 31 are abbreviated as "S". Furthermore, in the following descriptions, "step S" may simply be abbreviated as "S".

Figure 11:
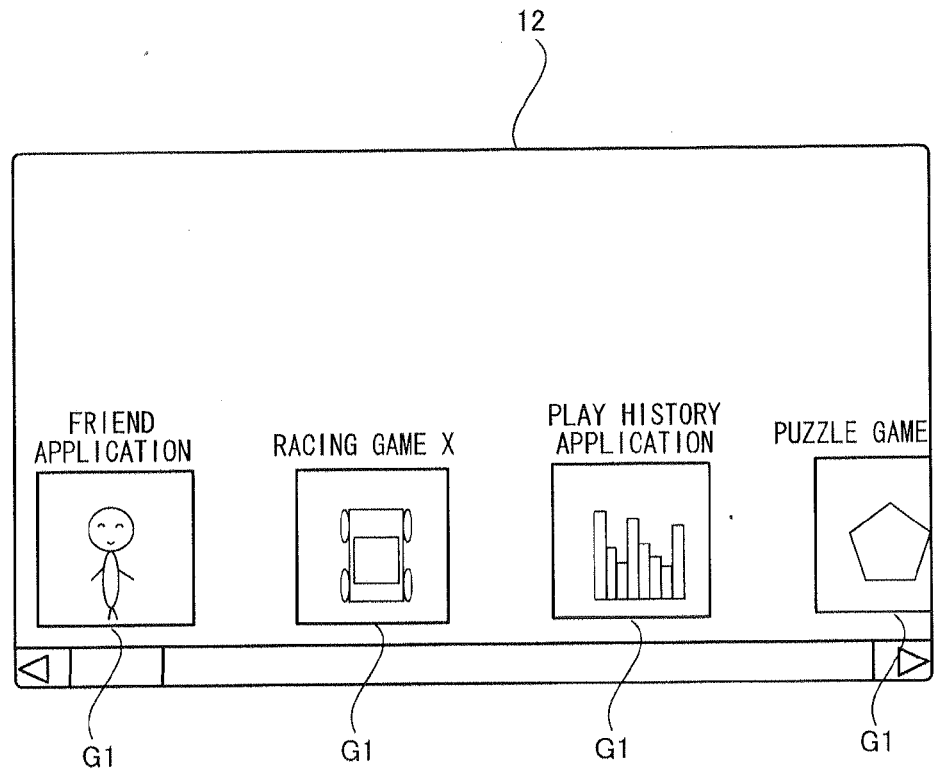
FIG. 11 is a diagram showing an example of a menu screen displayed in the game apparatus 1.

First, when the power supply of the game apparatus 1 is turned on and the execution of the main process program 80 starts, the CPU 31 causes a menu screen to be displayed on the lower LCD 12 in step S1 of FIG. 10. FIG. 11 is a diagram showing an example of the menu screen displayed in the game apparatus 1. As shown in FIG. 11, in the menu screen, icons G1 for applications executable by the game apparatus 1 are displayed. Here, the executable applications include the built-in application, the DL application, and the card application that are stored in the storage data memory 34. It should be noted that if the configuration is such that the card application is not stored in the storage data memory 34, the application stored in the cartridge 29 (or the memory card 28) that is not inserted (accommodated) in the game apparatus 1 is excluded from these executable applications. The user touches twice rapidly any of the icons G1 displayed in the menu screen, using the stylus 27 or the like, to select an application to be executed by the game apparatus 1. It should be noted that although FIG. 11 shows only four icons G1 displayed on the lower LCD 12, the user can cause other icons G1 to be displayed on the lower LCD 12 by scrolling the screen to the left or right. Thereafter, the processing proceeds to step S2.

In step S2, the CPU 31 determines whether or not the cartridge 29 has been inserted into the game apparatus 1. Specifically, the CPU 31 determines whether or not the cartridge 29 has been connected to the cartridge I/F 43. If the determination in step S2 is YES, the processing proceeds to step S3. If the determination is NO, the processing proceeds to step S6.

In step S3, the CPU 31 stores in the application storage area 100 of the storage data memory 34 the data of the application (the main body data (101), the metadata (102), and the application data (103)) stored in the cartridge 29. It should be noted that when the data to be stored is already stored, the CPU 31 overwrites the data, or does not store the data. Thereafter, the processing proceeds to step S4.

In step S4, the CPU 31 registers in the metadata database 200 (see FIG. 8 (1)) the metadata of the card application stored in the storage data memory 34 in step S3. It should be noted that when the metadata to be registered is already registered, the CPU 31 overwrites the metadata, or does not register the metadata. Thereafter, the processing proceeds to step S5.

In step S5, the CPU 31 causes an icon unique to the card application stored in the storage data memory 34 in step S3 to be additionally displayed in the menu screen displayed in step S1 (see FIG. 11). Thereafter, the processing proceeds to step S6.

In step S6, the CPU 31 determines whether or not the user has performed an operation to select any of the icons for the applications displayed in the menu screen. If the determination in step S6 is YES, the processing proceeds to step S7. If the determination is NO, the processing returns to step S1.

In step S7, the CPU 31 determines whether or not the icon of which the selection has been determined in step S6 is an icon for the card application. If the determination in step S7 is YES, the processing proceeds to step S9. If the determination is NO, the processing proceeds to step S8.

In step S8, the CPU 31 registers in the metadata database 200 the metadata of the application (that is, the built-in application or the DL application) corresponding to the icon of which the selection has been determined in step S6. It should be noted that when the metadata to be registered is already registered, the CPU 31 overwrites the metadata, or does not register the metadata. Thereafter, the processing proceeds to step S9. Here, with the processes of steps S7 and S8, it is possible to avoid redundant registration of the metadata of the card application registered in step S4.

In step S9, the CPU 31 stores the current date and time in the play start time data 1041*a* of the play history data 104 (see FIG. 8 (2)) corresponding to the application of which the selection has been determined in step S6. Thereafter, the processing proceeds to step S10.

In step S10, the CPU 31 starts the application of which the selection has been determined in step S6. Thereafter, the processing proceeds to step S11.

In step S11, the CPU 31 performs the process of the application started in step S10. It should be noted that examples of the application executed in step S11 include various applications, such as a versus game, a racing game, a sports game, and the message application described later (see FIG. 17). Thereafter, the processing proceeds to step S12.

In step S12, the CPU 31 stores the current date and time in the play end time data 1041*b* of the play history data 104 (see FIG. 8 (2)) corresponding to the application executed in step S11. Thereafter, the processing returns to step S1.

As described above, when the cartridge 29 has been accommodated in the game apparatus 1 for the first time by the main process, the metadata of the application stored in the cartridge 29 is registered in the metadata database 200 (S4). Further, when the built-in application or the DL application has been executed for the first time by the main process, the metadata of the application is registered in the metadata database 200 (S8). When the card application, the built-in application, or the DL application is played (executed), the play history of the application is stored (S9, S12).

[Passing Communication Process]

Next, a description is given of a passing communication process, which is realized by the CPU 31 and the wireless communication module 37 executing the passing communication program 90 stored in the storage data memory 34. When both the game apparatus 1 and another game apparatus 1 can execute the same application by each performing the passing communication process, the transmission/reception of predetermined information defined in the application is performed between the game apparatus 1 and said another game apparatus 1.

Figure 12:
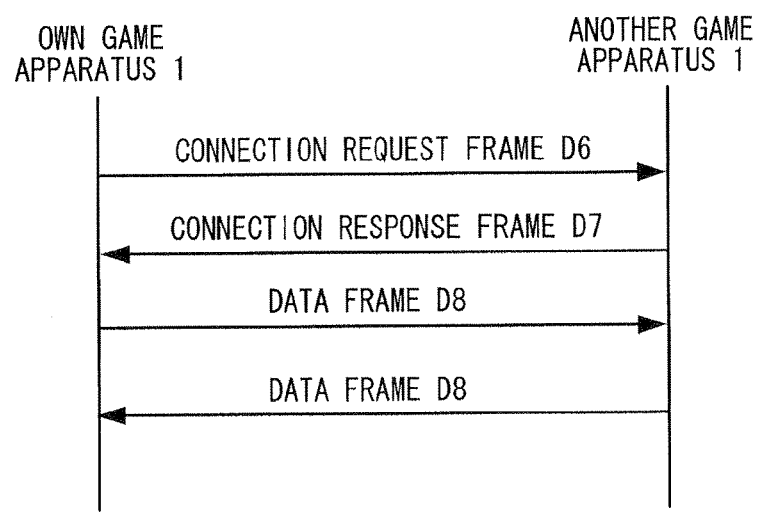
FIG. 12 is a communication sequence diagram showing an example of a passing communication process.

FIG. 12 is a communication sequence diagram showing an example of the passing communication process. FIG. 12 shows the case where the own game apparatus 1 transmits a connection request frame to another game apparatus 1. The own game apparatus 1 broadcasts a connection request frame D6 (beacon frame) to other game apparatuses 1 present within the communication range of the own game apparatus 1. When another game apparatus 1 receives the connection request frame D6, said another game apparatus 1 transmits a connection response frame D7 to the own game apparatus 1, which is the source of the connection request frame D6.

When having received the connection response frame D7, the own game apparatus 1 transmits a data frame D8 including the transmission box data 300*a* of the own apparatus (see FIG. 9) to said another game apparatus 1. Here, to the transmission box data 300*a*, the corresponding application ID data 102*c* (see FIG. 9 (1)) is attached. For example, in the case of the message application described later, the ID data 102*c* of the message application, the message data 301, the pasted metadata 302, and the metadata pasting position data 303 are included in the data frame D8 (see FIG. 9 (2)). When having received the data frame D8, said another game apparatus 1 transmits a data frame D8 generated by said another game apparatus 1 to the own game apparatus 1. In the present embodiment, such a series of communication steps are performed repeatedly at predetermined time intervals. In the case where the own game apparatus 1 is to receive the connection request frame D6, the own game apparatus 1 and said another game apparatus 1 should replace each other in FIG. 12.

Figure 13:
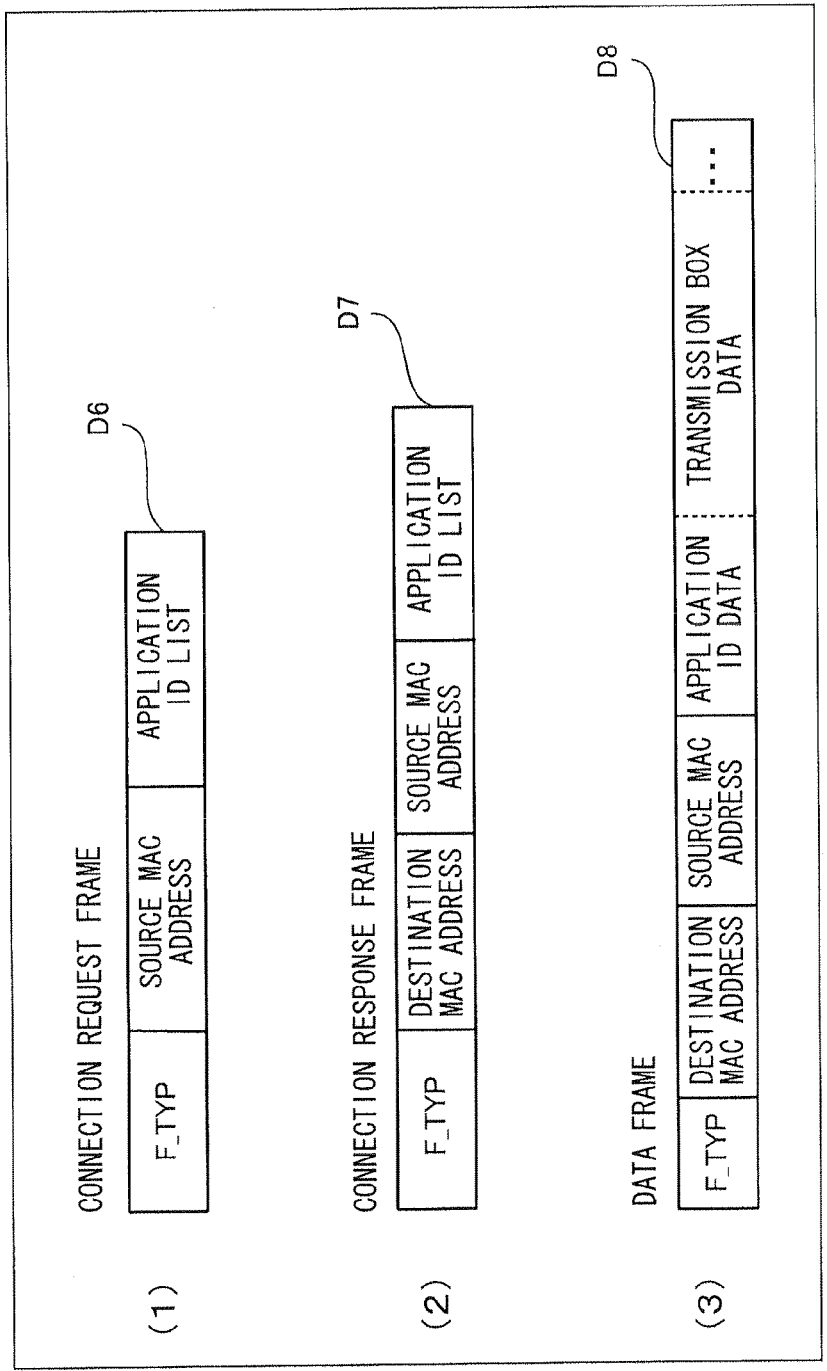
FIG. 13 is a diagram illustrating frames D6 to D8 transmitted/received by the passing communication process.

With reference to FIG. 13, a description is given below of the frames D6 to D8 transmitted/received by the passing communication process. FIG. 13 (1) is a diagram showing an example of the connection request frame D6. The connection request frame D6 includes a frame type F_TYP, a source Media Access Control (MAC) address, and an application ID list. The frame type F_TYP represents the type of the frame, and in this case, has written therein information representing the connection request frame D6. The application ID list is a list of all the pieces of application ID data 102c in the passing box data 300 of the game apparatus 1 (see FIG. 9 (1)) that transmits the connection request frame D6. In other words, the application ID list is a list of all the applications stored in the application storage area 100 of the storage data memory 34. Still in other words, the application ID list is a list of the application IDs of all the applications executable by the own game apparatus 1.

FIG. 13 (2) is a diagram showing an example of the connection response frame D7. The connection response frame D7 includes a frame type F_TYP, a destination MAC address, a source MAC address, and an application ID list. The frame type F_TYP has written therein information representing the connection response frame D7. The application ID list is a list of all the pieces of application ID data 102c in the passing box data 300 of the game apparatus 1 (see FIG. 9 (1)) that transmits the connection response frame D7.

FIG. 13 (3) is a diagram showing an example of the data frame D8. The data frame D8 includes a frame type F_TYP, a destination MAC address, a source MAC address, application ID data, and transmission box data. The frame type F_TYP has written therein information representing the data frame D8.

Figure 14:
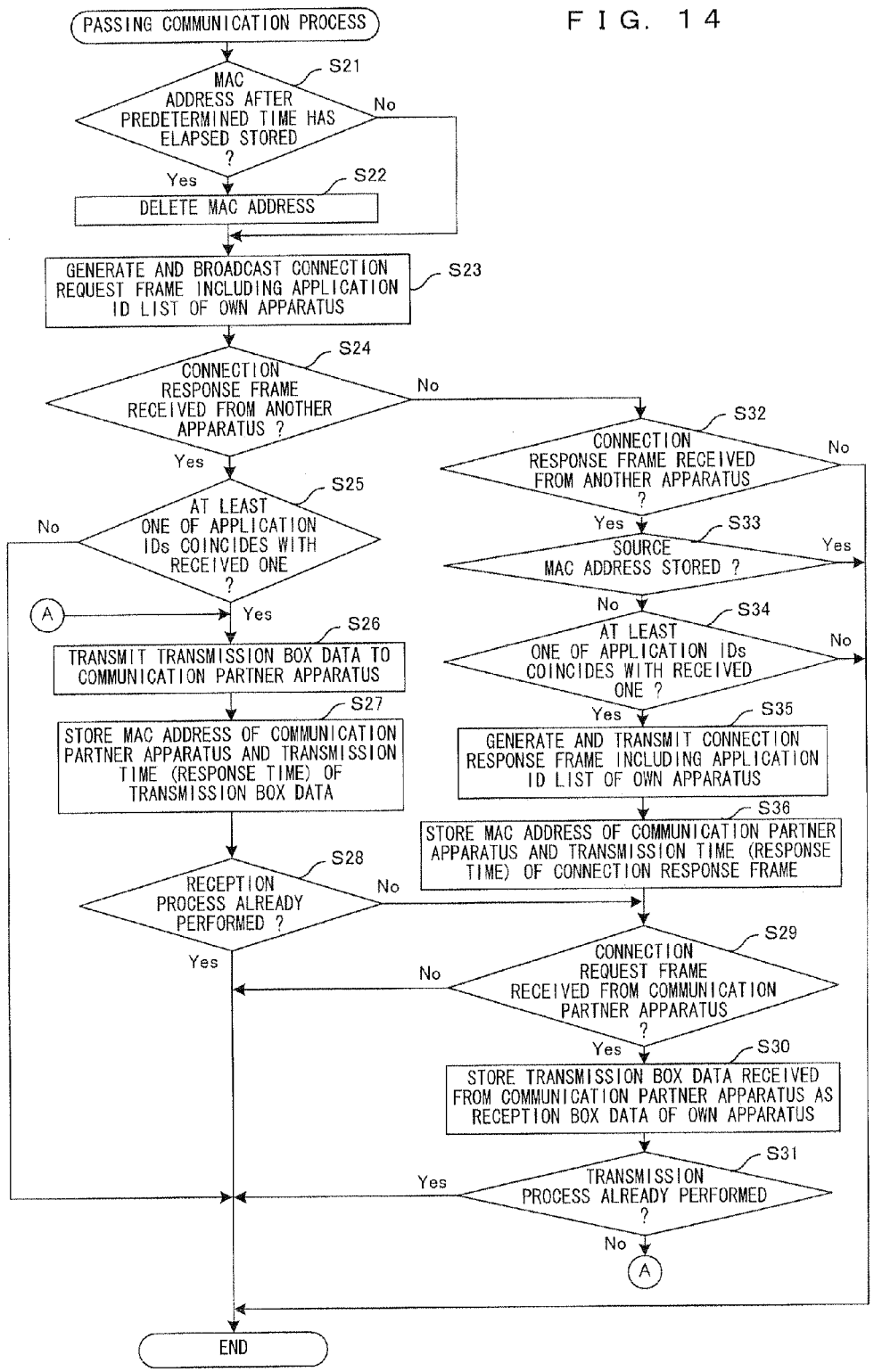
FIG. 14 is a flow chart showing an example of the passing communication process.

With reference to FIG. 14, a description is given below of the passing communication process performed by the game apparatus 1. FIG. 14 is a flow chart showing an example of the passing communication process performed by the game apparatus 1. The passing communication process is performed repeatedly at predetermined time intervals (for example, at intervals as short as several seconds).

First, in step S21, the wireless communication module 37 determines whether or not a MAC address after a predetermined period of time has elapsed since a response time is stored in its own memory (the internal memory of the wireless communication module 37). Here, the response time is the time when the connection response frame D7 has been transmitted in step S35 described later, or the time when the transmission box data has been transmitted to a communication partner apparatus in step S26 described later. If the determination in step S21 is YES, the processing proceeds to step S22. If the determination is NO, the processing proceeds to step S23.

In step S22, the wireless communication module 37 deletes the MAC address from its own memory. Thereafter, the processing proceeds to step S23.

In step S23, the wireless communication module 37 generates and broadcasts the connection request frame D6 including the application ID list of the own apparatus (see FIG. 13 (1)). Thereafter, the processing proceeds to step S24.

In step S24, the wireless communication module 37 determines whether or not the connection response frame D7 including the application ID list of another apparatus (see FIG. 13 (2)) has been received. If the determination in step S24 is YES, the processing proceeds to step S25. If the determination is NO, the processing proceeds to step S32.

In step S25, the wireless communication module 37 determines whether or not at least one of the application IDs included in the application ID list of said another apparatus included in the received connection response frame D7 coincides with an application ID included in the application ID list of the own apparatus. If the determination in step S25 is YES, the processing proceeds to step S26. If the determination is NO, the current passing communication process ends. It should be noted that the wireless communication module 37 stores the application ID list of the own apparatus in its own memory when the power supply is turned on, and thereby makes the determination in step S25 using the stored application ID list.

In step S26, the wireless communication module 37 causes the CPU 31 to read from the passing box data 300 (see FIG. 9 (1)) the transmission box data corresponding to the application having the application ID of which the coincidence has been determined in step S25, and the wireless communication module 37 transmits the data frame D8 including the transmission box data to the communication partner apparatus (the source of the connection response frame D7). Thereafter, the processing proceeds to step S27.

In step S27, the wireless communication module 37 stores in its own memory the MAC address of the communication partner apparatus (the source of the connection response frame D7), and the time when the transmission box data has been transmitted in step S26 (response time). Thereafter, the processing proceeds to step S28. Here, the MAC address of the communication partner apparatus and the response time are used to prohibit communication with the same communication partner in a predetermined period of time from the response time. This makes it possible to avoid redundant communication with the same partner during a short period of time. It should be noted that when a predetermined period of time has elapsed since the response time, the MAC address of the communication partner apparatus is deleted by the processes of steps S21 and S22, and the prohibition of communication is lifted.

In step S28, the wireless communication module 37 determines whether or not a process of receiving the transmission box data (data frame D8) of the communication partner apparatus has already been performed. If the determination in step S28 is YES, the passing communication process ends. If the determination is NO, the processing proceeds to step S29.

In step S29, the wireless communication module 37 performs a process of receiving the transmission box data 300a (data frame D8) from the communication partner apparatus. Two game apparatuses 1 performing the passing communication process transmit/receive the data frame D8 to/from each other. Accordingly, when the own game apparatus 1 has yet to receive the data frame D8, the processing proceeds to step S29. If the own apparatus has received the transmission box data 300a from the communication partner apparatus in step S29, the processing proceeds to step S30. If the own apparatus has not received the transmission box data 300a, the passing communication process ends.

In step S30, the wireless communication module 37 instructs the CPU 31 to store the transmission box data of the communication partner apparatus received in step S29, as the reception box data 300b of the own apparatus (see FIG.

9). During the process, the CPU 31 stores the transmission box data as the reception box data of the application represented by the application ID data attached to the transmission box data. That is, the CPU 31 stores the received transmission box data in the reception box of the same application, using the application ID data. Thereafter, the processing proceeds to step S31.

In step S31, the wireless communication module 37 determines whether or not a process of transmitting the transmission box data (data frame D8) of the own apparatus has already been performed. If the determination in step S31 is YES, the passing communication process ends. If the determination is NO, the processing proceeds to step S26.

In step S32, the wireless communication module 37 determines whether or not the connection request frame D6 including the application ID list of another apparatus (see FIG. 13 (1)) has been received. If the determination in step S32 is YES, the processing proceeds to step S33. If the determination is NO, the passing communication process ends.

In step S33, the wireless communication module 37 determines whether or not the source MAC address is stored in its own memory. If the determination in step S33 is YES, the current passing communication process ends. If the determination is NO, the processing proceeds to step S34. With this process, it is possible to avoid redundant communication with the same partner during a short period of time.

In step S34, the wireless communication module 37 determines whether or not at least one of the application IDs included in the application ID list of said another apparatus included in the received connection request frame D6 coincides with an application ID included in the application ID list of the own apparatus. If the determination in step S34 is YES, the processing proceeds to step S35. If the determination is NO, the current passing communication process ends. It should be noted that the wireless communication module 37 stores the application ID list of the own apparatus in its own memory when the power supply is turned on, and thereby makes the determination in step S34 using the stored application ID list.

In step S35, the wireless communication module 37 generates the connection response frame D7 (see FIG. 13 (2)) including the application ID list of the own apparatus, and transmits the connection response frame D7 to the communication partner apparatus (the source of the connection request frame). Thereafter, the processing proceeds to step S36.

In step S36, the wireless communication module 37 stores in its own memory the MAC address of the communication partner apparatus (the source of the connection request frame D6), and the time when the connection response frame D7 has been transmitted in step S35 (response time). Thereafter, the processing proceeds to step S29. Here, the MAC address of the communication partner apparatus and the response time are used to prohibit communication with the same communication partner in a predetermined period of time from the response time. This makes it possible to avoid redundant communication with the same partner during a short period of time. It should be noted that when a predetermined period of time has elapsed since the response time, the MAC address of the communication partner apparatus is deleted by the processes of steps S21 and S22, and the prohibition of communication is lifted.

[Message Application Process]

Next, a description is given of a message application process, which is realized by the CPU 31 executing the message application, which is one of the applications stored in the application storage area 100 of the storage data memory 34. FIG. 15 is a flow chart showing an example of the message application process. The message application process is one of the application processes performed in step S11 of the main process of FIG. 10.

First, in step S41, the CPU 31 determines whether or not newly arrived reception data is present in the reception box data 300b of the message application (see FIG. 9 (2)) for passing communication. More specifically, the CPU 31 determines whether or not new data has been received as the reception box data of the passing box data of the message application shown in FIG. 9 (2), by passing communication. If the determination in step S41 is YES, the processing proceeds to step S42. If the determination is NO, the processing proceeds to step S44.

In step S42, the CPU 31 reads the newly arrived data (the reception box data 300b of the message application shown in FIG. 9 (2)) of which the new arrival has been determined in step S41, as the saved message data 103b shown in FIG. 7 (1). Thereafter, the processing proceeds to step S43.

In step S43, the CPU 31 deletes the reception box data 300b of the message application. Thereafter, the processing proceeds to step S44. With the processes of steps S41 through S43, the reception of data (message) using passing communication is performed by the message application at regular time intervals.

In step S44, the CPU 31 causes a menu screen of the message application to be displayed on the lower LCD 12. In the menu screen, the following are displayed: a "create message" controller; a "receive message from server" controller; a "transmit/receive message by local communication" controller; and a list of saved messages saved as the created/received message data shown in FIG. 7 (1) (a list of the 10 most recently saved messages). Thereafter, the processing proceeds to step S45.

In step S45, the CPU 31 determines whether or not the user has performed an operation to select the "create message" controller. Specifically, the CPU 31 uses the touch panel 13 to detect an operation of the user selecting the "create message" controller, and thereby determines whether or not the "create message" controller has been selected. If the determination in step S45 is YES, the processing proceeds to step S46. If the determination is NO, the processing proceeds to step S69.

In step S46, the CPU 31 causes a message creation screen to be displayed on the lower LCD 12. The user can write a handwritten message on the message creation screen by performing an operation of writing characters or the like on a handwriting area within the message creation screen, using the stylus 27 or the like. Thereafter, the processing proceeds to step S47. It should be noted that in the present embodiment, a predetermined area on the lower LCD 12 is set as the handwriting area.

In step S47, the CPU 31 determines whether or not track drawing (a drawing operation using a track) has been detected. Specifically, based on a detection signal of a touch operation from the touch panel 13, the CPU 31 determines whether or not an operation of the user writing characters or the like on the message creation screen using the stylus 27 or the like has been detected. If the determination in step S47 is YES, the processing proceeds to step S48. If the determination is NO, the processing proceeds to step S49.

In step S48, based on the detection in step S47, the CPU 31 draws the track, drawn on the message creation screen by the user using the stylus 27 or the like, on the message creation screen as a handwritten message. Thereafter, the processing proceeds to step S49.

In step S49, based on a button operation or the like performed by the user, the CPU 31 determines whether or not an instruction has been given to paste metadata to the message. If the determination in step S49 is YES, the processing proceeds to step S50. If the determination is NO, the processing proceeds to step S53.

In step S50, with reference to the play history data 104 (see FIG. 8), the CPU 31 causes a list of the metadata of the applications (typically, icons for the applications, or titles of the applications) having play histories to be displayed on the message creation screen. More specifically, for example, a list of the metadata is displayed in a different area from, and together with, the handwriting area on the lower LCD 12. Alternatively, as another example, a touch button for calling up a list of the metadata may be displayed together with the handwriting area displayed on the lower LCD 12. In this case, when the user has performed an operation to select the touch button, the list of the metadata is displayed. After metadata has been selected, the list becomes hidden, and thereafter, the handwriting area reappears so that it is possible to further create a message. It should be noted that the list of the metadata may be displayed such that the metadata is arranged in the reverse chronological order of the times of the play. Thereafter, the processing proceeds to step S51.

In step S51, the CPU 31 determines whether or not the user has performed an operation, using the stylus or the like, to select any of the pieces of metadata from the list of the metadata displayed in step S50. If the determination in step S51 is YES, the processing proceeds to step S52. If the determination is NO, the processing returns to step S50.

In step S52, the CPU 31 pastes the piece of metadata of which the selection has been determined in step S51, as pasted metadata in an initial position within the handwritten message. Specifically, the CPU 31 reads (copies) the selected piece of metadata from the metadata database 200 (see FIG. 8 (1)), and pastes the selected piece of metadata in a predetermined position within the message that is being created. It should be noted that the initial position is a predetermined position, such as the lower center of the message creation screen. Thereafter, the processing proceeds to step S53.

In step S53, the CPU 31 determines whether or not the user has performed an operation, using the stylus 27 or the like (a drag operation, for example), to give an instruction to move the pasting position of the metadata. If the determination in step S53 is YES, the processing proceeds to step S54. If the determination is NO, the processing proceeds to step S56.

In step S54, in accordance with the instruction to move the pasting position of the metadata, the CPU 31 moves the pasting position of the metadata displayed on the message creation screen. Thereafter, the processing proceeds to step S55.

In step S55, based on the position after being moved in the process of step S54, the CPU 31 updates the pasting position of the metadata that is temporarily stored in the main memory 32. Thereafter, the processing proceeds to step S56.

In step S56, the CPU 31 determines whether or not the user has performed a button operation or the like to give an instruction to transmit the created handwritten message. If the determination in step S56 is YES, the processing proceeds to step S57. If the determination is NO, the processing returns to step S46.

In step S57, the CPU 31 saves the handwritten message to be transmitted in accordance with the instruction, as the saved message data 103b included in the application data 103 of the message application (see FIG. 7 (1)). Specifically, the CPU 31 saves the data of the handwritten message drawn in step S48, as the handwritten message data 103c in the saved message data 103b; the CPU 31 saves the data of the pasted metadata pasted in the handwritten message in step S52, as the pasted metadata 103e in the saved message data 103b; and the CPU 31 saves the data of the latest pasting position of the metadata updated in step S55, as the metadata pasting position data 103f in the saved message data 103b. It should be noted that although the process is not shown in FIG. 15, when the user has performed an operation to paste, in the handwritten message, image data of an image captured by the inner camera 23 or the outer camera 25, or image data acquired from another apparatus, the CPU 31 saves the image data as the pasted image data 103d in the saved message data 103b in step S57. Thereafter, the processing proceeds to step S58.

In step S58, the CPU 31 causes a transmission setting screen to be displayed on the lower LCD 12. In the transmission setting screen, the following are displayed: a "transmit via server" controller; a "transmit by local communication" controller; and a "transmit by passing communication" controller. Thereafter, the processing proceeds to step S59.

In step S59, the CPU 31 determines whether or not the user has performed an operation, using the stylus 27 or the like, to select the "transmit via server" controller in the transmission setting screen. In other words, the CPU 31 determines whether or not a method of transmission via the server 4 has been selected as the method of transmitting the handwritten message or the like saved in step S57. If the determination in step S59 is YES, the processing proceeds to step S60. If the determination is NO, the processing proceeds to step S63.

In step S60, in accordance with an operation of the user, the CPU 31 sets the destination to which the handwritten message saved in step S57 is to be transmitted. Specifically, the CPU 31 causes a list of friends (other game apparatuses 1 registered as friends) represented by the friend list data 400 (see FIG. 5) to be displayed in the transmission setting screen. The user selects a desired friend from the list, and thereby specifies the destination of the transmission. Further, the "transmit to all friends" controller is also displayed in the transmission setting screen. The user cans select this controller, and thereby collectively specify all the friends represented by the friend list data 400, as the destinations of the transmission. Thereafter, the processing proceeds to step S61.

In step S61, the CPU 31 copies into an outbox the handwritten message to be transmitted. Specifically, the CPU 31 copies into the outbox data 103g the data of the handwritten message saved as the saved message data 103b in step S57, as the message-to-be-transmitted data 103h (see FIG. 7 (1)). Thereafter, the processing proceeds to step S62.

In step S62, the CPU 31 transmits to the server 4 the handwritten message copied in the outbox. Specifically, the CPU 31 uses the wireless communication module 37 to transmit the message-to-be-transmitted data 103h copied in the outbox data 103g, to the server 4 via the network 3 (see FIG. 3). The server 4 transmits (transfers) the received handwritten message (103h) via the network 3 to another game apparatus 1 that is the destination set in step S60. Here, the method of transmission via the server 4 depends on the state of connection between the game apparatus 1 and the network 3. Due to this, when the connection between the game apparatus 1 and the network 3 has been established, the handwritten message in the outbox is transmitted to the server 4. Thereafter, the processing returns to step S44.

In step S63, on the other hand, the CPU 31 determines whether or not the user has performed an operation, using the stylus 27 or the like, to select the "transmit by local communication" controller in the transmission setting screen. In other words, the CPU 31 determines whether or not a method of transmission by local communication has been selected as the method of transmitting the handwritten message or the like saved in step S57. It should be noted that the local communication is described later with reference to FIG. 16. If the determination in step S63 is YES, the processing proceeds to step S64. If the determination is NO, the processing proceeds to step S67.

In step S64, similarly to step S61, the CPU 31 copies into the outbox the handwritten message to be transmitted. Thereafter, the processing proceeds to step S65.

In step S65, the CPU 31 performs a local communication process. FIG. 16 is a flow chart showing an example of the local communication process of step S65 of FIG. 15. With reference to FIG. 16, the local communication process is described below.

First, in step S81, the wireless communication module 37 searches for communication partner apparatuses. Specifically, the wireless communication module 37 transmits a beacon frame, and thereby searches for other game apparatuses 1 to be communication partners for a predetermined period of time. Thereafter, the processing proceeds to step S82.

In step S82, the wireless communication module 37 determines whether or not communication partner apparatuses have been found. Specifically, based on whether or not response frames responding to the beacon frame transmitted in step S81 have been received, the wireless communication module 37 determines whether or not other game apparatuses 1 to be communication partners have been found. If the determination in step S82 is YES, the processing proceeds to step S83. If the determination is NO, the local communication process ends, and the processing proceeds to step S66 of FIG. 15.

In step S83, the CPU 31 causes a list of the communication partner apparatuses found in step S82 to be displayed on the lower LCD 12. Thereafter, the process proceeds to step S84.

In step S84, the CPU 31 waits until the user performs an operation, using the stylus 27 or the like, to select any of the communication partner apparatuses from the list of the communication partner apparatuses displayed on the lower LCD 12. When any of the communication partner apparatuses has been selected, the processing proceeds to step S85.

In step S85, the CPU 31 uses the wireless communication module 37 to transmit to the communication partner apparatus selected in step S84 a selection notification notifying that the communication partner apparatus has been selected as a communication partner. Thereafter, the process proceeds to step S86.

In step S86, the CPU 31 determines whether or not a selection notification transmitted from the communication partner apparatus to which the selection notification has been transmitted in step S85 has been received. If the determination in step S86 is YES, the processing proceeds to step S87. If the determination is NO, the local communication process ends, and the processing proceeds to step S66 of FIG. 15.

In step S87, the CPU 31 transmits the message in the outbox to the communication partner apparatus to which the selection notification has been transmitted in step S85, by Near Field Communication using the wireless communication module 37. More specifically, the CPU 31 transmits by Near Field Communication the message-to-be-transmitted data 103h copied into the outbox data 103g in step S64 of FIG. 15. Thereafter, the processing proceeds to step S88.

In step S88, the CPU 31 receives a message transmitted from the communication partner apparatus to which the selection notification has been transmitted in step S85, the message transmitted by the communication partner apparatus performing a similar process to that of step S87. Thereafter, the processing proceeds to step S89. It should be noted that when the communication partner apparatus does not have any message to be transmitted, the CPU 31 does not receive a message from the communication partner apparatus in step S88.

In step S89, the CPU 31 saves the message received from the communication partner apparatus in step S88, as the saved message data 103b (see FIG. 7 (1)). Thereafter, the local communication process ends, and the processing proceeds to step S66 of FIG. 15.

As described above, the transmission/reception of a message is performed by the local communication process between the game apparatus 1 and another game apparatus 1, using Near Field Communication.

Figure 15:
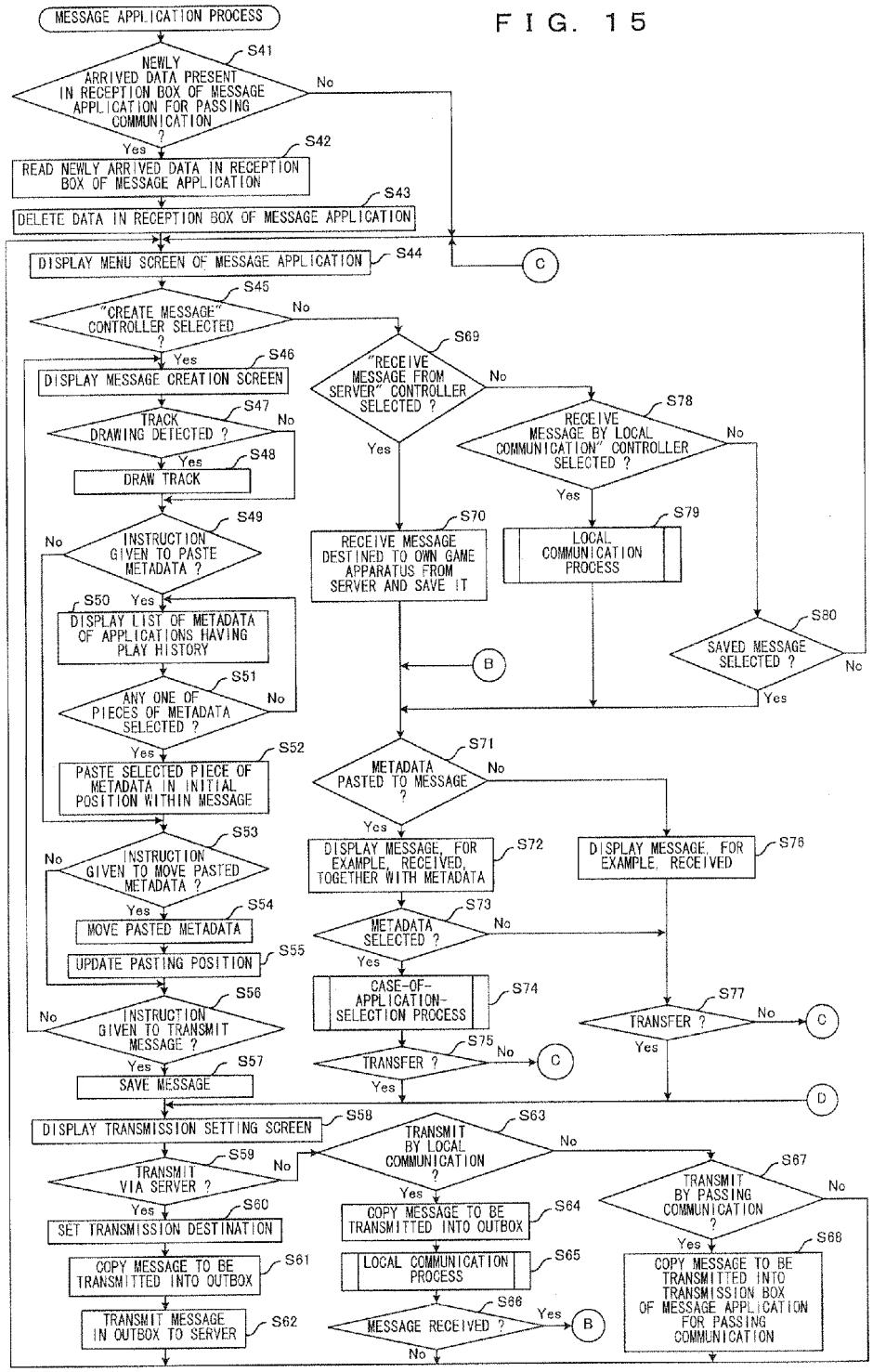
FIG. 15 is a flow chart showing an example of a message application process.
Figure 16:
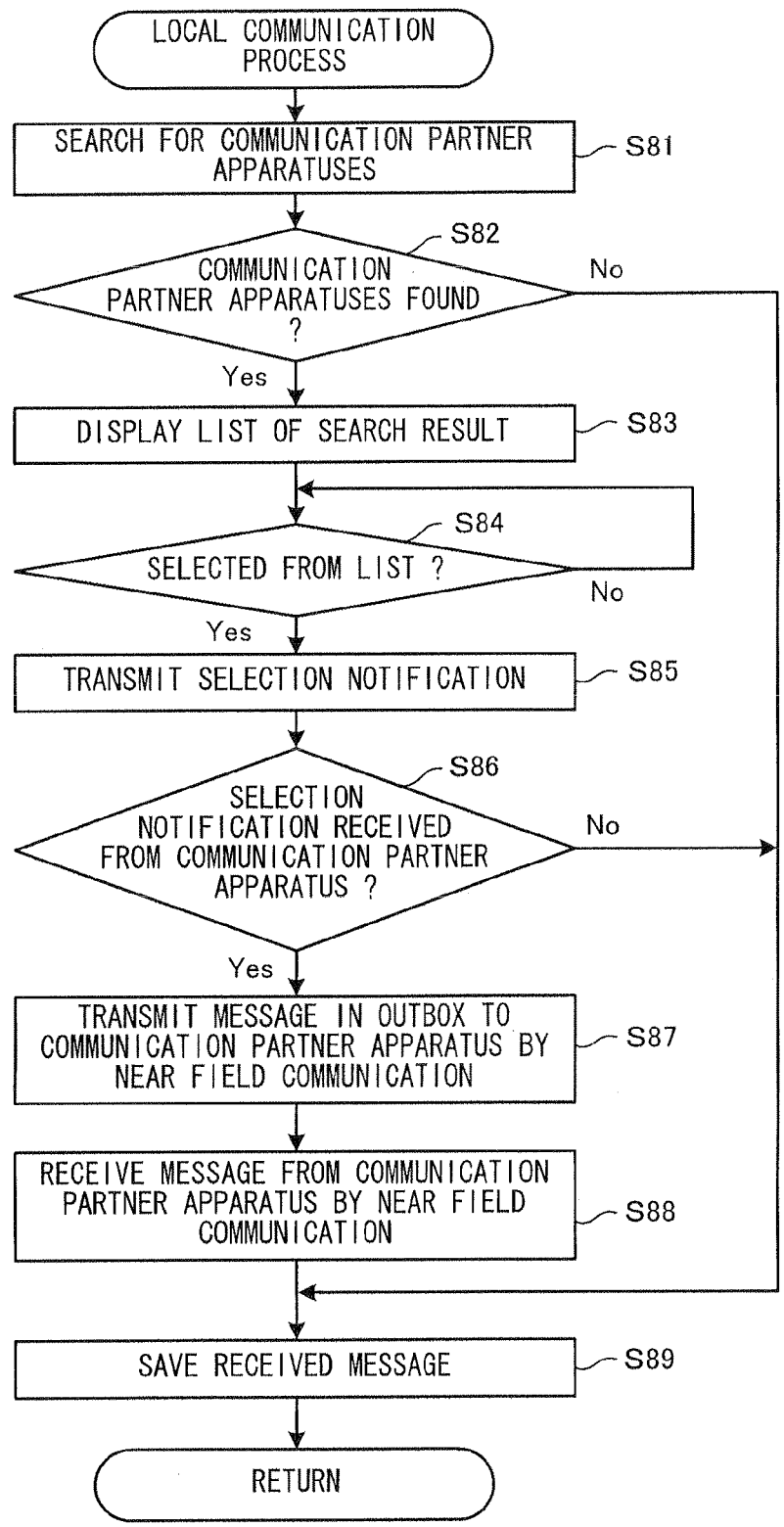
FIG. 16 is a flow chart showing an example of a local communication process.

In step S66 of FIG. 15, the CPU 31 determines whether or not a message has been received from the communication partner apparatus in the local communication process of step S65. If the determination in step S66 is YES, the processing proceeds to step S71. If the determination is NO, the processing returns to step S44.

Next, in step S67, the CPU 31 determines whether or not the user has performed an operation, using the stylus 27 or the like, to select the "transmit by passing communication" controller in the transmission setting screen. In other words, the CPU 31 determines whether or not a method of transmission by the passing communication described with reference to FIG. 14 has been selected as the method of transmitting the handwritten message or the like saved in step S57. If the determination in step S67 is YES, the processing proceeds to step S68. If the determination is NO, the processing returns to step S44.

In step S68, the CPU 31 copies the data of the handwritten message saved as the saved message data 103b (see FIG. 7 (1)) in step S57, as the transmission box data 300a in the passing box data of the message application (see FIG. 9 (2)). With this, the passing communication process of FIG. 14 is performed. Accordingly, the transmission/reception of data is performed between the game apparatus 1 and unspecified communication partner apparatuses, and the handwritten message is transmitted to unspecified communication partner apparatuses. Thereafter, the processing returns to step S44.

In step S69, on the other hand, the CPU 31 determines whether or not the user has performed an operation to select the "receive message from server" controller. Specifically, the CPU 31 uses the touch panel 13 to detect an operation of the user selecting the "receive message from server" controller, and thereby determines whether or not the "receive message from server" controller has been selected. If the determination in step S69 is YES, the processing proceeds to step S70. If the determination is NO, the processing proceeds to step S78.

In step S70, the CPU 31 connects to the server 4 via the network 3, receives a message destined to the own game apparatus 1 from the server 4, and saves the message as the saved message data 103b shown in FIG. 7 (1). Here, the process of receiving the message from the server 4 depends on the state of connection between the game apparatus 1 and the network 3. Due to this, when the connection between the game apparatus 1 and the network 3 has been established, the message is received from the server 4. Thereafter, the processing proceeds to step S71.

In step S78, the CPU 31 determines whether or not the user has performed an operation to select the "receive message by local communication" controller. Specifically, the CPU 31 uses the touch panel 13 to detect an operation of the user selecting the "receive message by local communication" controller, and thereby determines whether or not the "receive message by local communication" controller has been selected. If the determination in step S78 is YES, the processing proceeds to step S79. If the determination is NO, the processing proceeds to step S80.

In step S79, the CPU 31 performs the local communication process described with reference to FIG. 16, performs the transmission/reception of a message between the game apparatus 1 and the communication partner apparatus, using Near Field Communication, and receives a message from the communication partner apparatus. Thereafter, the processing proceeds to step S71.

In step S80, the CPU 31 determines whether or not any message has been selected from a list of saved messages displayed in the menu screen. Specifically, the CPU 31 uses the touch panel 13 to detect an operation of the user selecting a message, and thereby determines whether or not any message has been selected. If the determination in step S80 is YES, the processing proceeds to step S71. If the determination is NO, the processing returns to step S44.

In step S71, the CPU 31 determines whether or not metadata (typically, an icon for, or a title of, the application) is pasted to: the message received from the server 4 in step S70; the message received in the local communication process of step S79; the message selected by the user in step S80; or the message received in the local communication process of step S65. If the determination in step S71 is YES, the processing proceeds to step S72. If the determination is NO, the processing proceeds to step S76.

In step S72, the CPU 31 causes the message of which the determination has been made in step S71 (that is, the message, for example, received) to be displayed on the lower LCD 12, together with the metadata pasted to the message. Thereafter, the processing proceeds to step S73. More specifically, the metadata may be superimposed on the message when displayed. In this case, the "position of the metadata" in the message set in steps S52 through S55 described above may be reproduced. Alternatively, as another example, the metadata may be displayed together with the message in a different area from the display area of the message.

In step S73, the CPU 31 determines whether or not the user has selected the metadata displayed in step S72. Specifically, the CPU 31 uses the touch panel 13 to detect an operation of the user selecting the metadata, and thereby determines whether or not the metadata has been selected. If the determination in step S73 is YES, the processing proceeds to step S74. If the determination is NO, the processing proceeds to step S77. It should be noted that when a plurality of pieces of metadata have been displayed in step S72 because the plurality of pieces of metadata are attached, the CPU 31 determines in step S73 whether or not the user has selected any of the plurality of pieces of metadata.

In step S76, on the other hand, the CPU 31 causes the message of which the determination has been made in step S71 (that is, the message, for example, received) to be displayed on the lower LCD 12. Thereafter, the processing proceeds to step S77.

In step S77, the CPU 31 determines whether or not the message displayed in step S72 or S76 is to be transferred to another game apparatus 1. Specifically, the "transfer received message" controller is displayed in the display screen in steps S72 and S76. The CPU 31 uses the touch panel 13 to detect an operation of the user selecting the controller, and thereby determines whether or not the message displayed in step S72 or S76 is to be transferred to another game apparatus 1. If the determination in step S77 is YES, the processing proceeds to step S58. If the determination is NO, the processing returns to step S44.

In step S74, on the other hand, the CPU 31 performs a case-of-application-selection process described later with reference to FIGS. 18 and 19. It should be noted that in the case-of-application-selection process, the CPU 31 communicates with the server 4; the CPU 31 causes detailed information (the content, the price, and the like), about the application represented by the metadata of which the selection has been determined in step S73, to be displayed on the lower LCD 12 or the like; and the CPU 31 downloads the application from the server 4 in accordance with an instruction from the user. Thereafter, the processing proceeds to step S75.

In step S75, the CPU 31 determines whether or not the message displayed in step S72 is to be transferred to another game apparatus 1. Specifically, the "transfer received message" controller is displayed in the display screen in step S72. The CPU 31 uses the touch panel 13 to detect an operation of the user selecting the controller, and thereby determines whether or not the message displayed in step S72 is to be transferred to another game apparatus 1. If the determination in step S75 is YES, the processing proceeds to step S58. If the determination is NO, the processing returns to step S44.

[Process of Predetermined Game Application]

With reference to FIG. 17, a description is given below of an example of a predetermined game application process. Here, a predetermined game application is a type of game application that presents a message to a user who has completed a game of the game application. Typically, the message commends and certifies the completion of the game. By the message application described with reference to FIG. 15, the user can transmit to another game apparatus 1 a message presented when the user has completed a game of the game application. A detailed description is given below.

When a predetermined game has started, the CPU 31 executes predetermined game processing in step S91. It should be noted that examples of the predetermined game may include various games, such as a racing game, a sports game, and a combat game, and the predetermined game may be any type of game. Thereafter, the processing proceeds to step S92.

In step S91, the CPU 31 determines whether or not the game of the game processing executed in step S91 has been completed. If the determination in step S91 is YES, the processing proceeds to step S93. If the determination is NO, the processing proceeds to step S95.

In step S95, the CPU 31 determines whether or not the user has performed a predetermined operation to instruct the game of the game processing executed in step S91 to end. If the determination in step S95 is YES, the game ends. If the determination is NO, the processing returns to step S91, and the game continues.

In step S93, on the other hand, the CPU 31 reads the presented-at-completion-of-game data 103m (data of a message presented to a user who has completed the game) as the saved message data 103*b* of the message application. Specifically, the CPU 31 reads the presented-at-completion-of-game data 103*m* in the application data 103 of the predetermined game application (see FIG. 7 (2)), as the saved message data 103*b* in the application data 103 of the message application (see FIG. 7 (1)). Thereafter, the processing proceeds to step S94.

In step S94, the CPU 31 starts the message application, and starts the message application process of FIG. 15. In this case, the processing proceeds to step S58 of FIG. 15, and the CPU 31 starts the message application process, from the process of causing the transmission setting screen to be displayed in step S58 of FIG. 15. As described above, the game processing is executed by the predetermined game application process, and when the game has been completed, a predetermined message is presented to the user as a saved message of the message application.

When the processing has proceeded from step S94 of FIG. 17 to step S58 of FIG. 15: the CPU 31 transmits by passing communication the presented-at-completion-of-game data 103*m* read in step S93 of FIG. 17, if the CPU 31 performs the processes of steps S60 through S62; the CPU 31 transmits via the server 4 the presented-at-completion-of-game data 103*m*, if the CPU 31 performs the processes of steps S64 and S65; or the CPU 31 transmits by the local communication process the presented-at-completion-of-game data 103*m*, if the CPU 31 performs the process of step S68.

[Case-of-Application-Selection Process]

Figure 18:
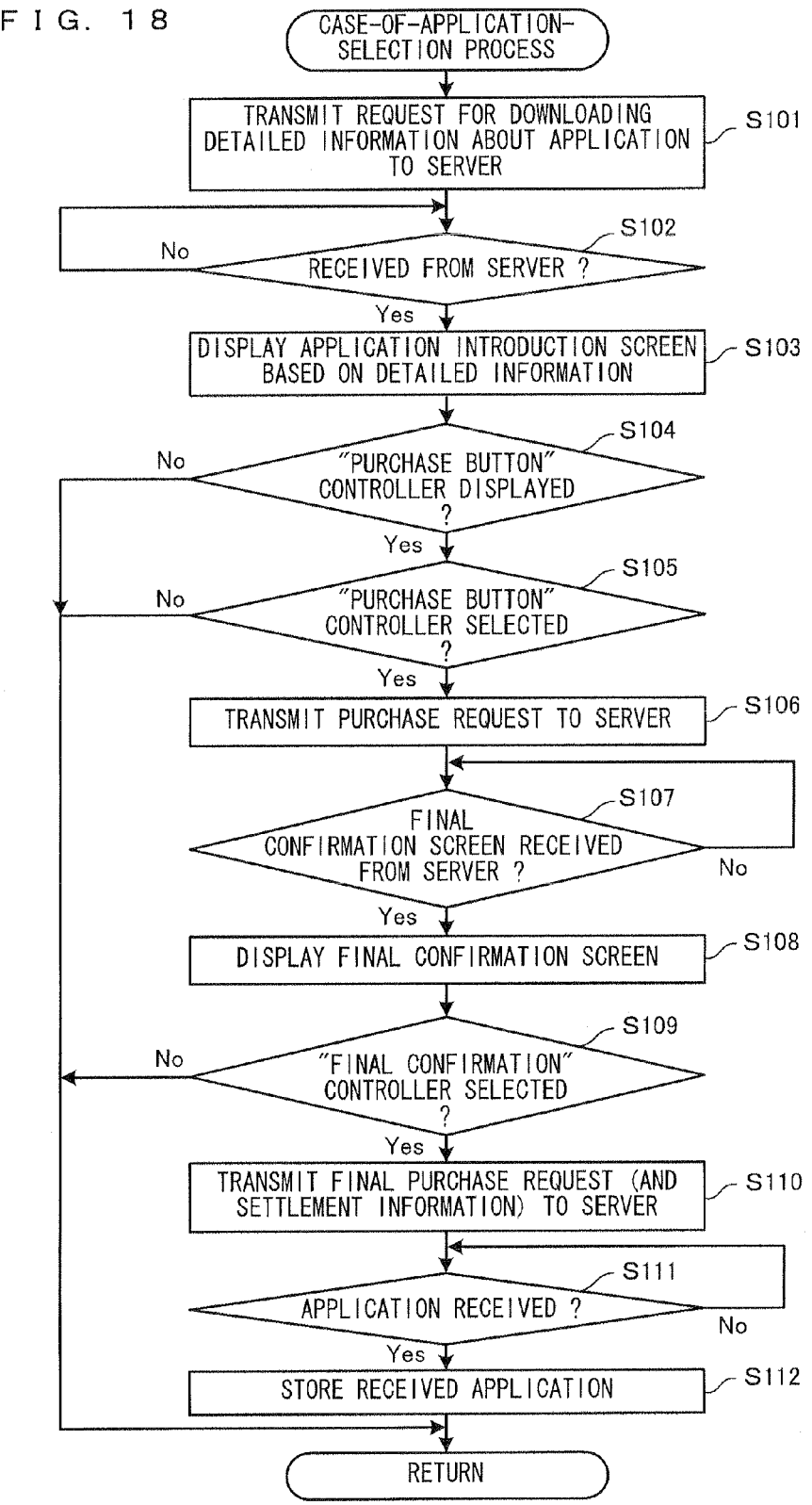
FIG. 18 is a flow chart showing an example of a case-of-application-selection process.

With reference to FIG. 18, a description is given of an example of the case-of-application-selection process performed in step S74 of the message application process of FIG. 15. FIG. 18 is a flow chart showing an example of the case-of-application-selection process.

First, in step S101, the CPU 31 transmits, to the server 4 via the network 3, a download request for the detailed information about the application represented by the metadata (typically, an icon for, or a title of, the application) of which the selection has been determined in step S73 of FIG. 15. It should be noted that this request includes the metadata of which the selection has been determined in step S73 of FIG. 15. Thereafter, the processing proceeds to step S102.

In step S102, the CPU 31 waits until it receives from the server 4 the detailed information for which the download request has been made in step S101. When it is determined that the detailed information has been received from the server 4, the processing proceeds to step S103.

In step S103, the CPU 31 generates an application introduction screen based on the detailed information (an example of introduction information and guide information according to the present invention), and causes the application introduction screen to be displayed on the lower LCD 12 or the upper LCD 22. Thereafter, the processing proceeds to step S104. Here, in the application introduction screen, an image introducing the application and a description of the application are displayed. As well as these, information necessary for the user to make a decision to purchase the application is displayed, such as the necessary amount of money (or points substituting for money) to purchase the application. Further, in a predetermined case (where the determination in step S104 described later is YES), a user interface for receiving a purchase operation of the application from the user (typically, a "purchase button" is displayed, on which the user can perform a click operation and which receives the click operation) is provided in the application introduction screen. It should be noted that when the server 4 does not sell the application corresponding to the detailed information received in step S102, the user interface for receiving a purchase operation of the application from the user is not provided in the application introduction screen (that is, the "purchase button" is not displayed).

In step S104, the CPU 31 determines whether or not a "purchase button" controller is displayed in the application introduction screen displayed in step S103. If the determination in step S104 is YES, the processing proceeds to step S105. If the determination is NO, the case-of-application-selection process ends, and the processing proceeds to step S75 of FIG. 15.

Here, the server 4 has the function of a shop server (a server providing at least a user interface for download sales, and normally, a server storing a plurality of applications for download sales) that sells (distributes via the Internet) an application corresponding to received metadata, and the application introduction screen displayed in step S103 serves as an interface for purchasing an article (application). The CPU 31 determines, using the interface, whether or not the user has performed a purchase operation of the application. Specifically, in step S105, the CPU 31 determines whether or not the user has selected the "purchase button" controller displayed in the application introduction screen. If the determination in step S105 is YES, the processing proceeds to step S106. If the determination is NO, the case-of-application-selection process ends, and the processing proceeds to step S75 of FIG. 15.

In step S106, the CPU 31 transmits a purchase request received by the operation (purchase operation) performed in step S105 to the server 4. Thereafter, the processing proceeds to step S107.

In step S107, the CPU 31 waits until it receives, from the server 4, data of a final confirmation screen for obtaining a final confirmation of the purchase of the application from the user. When the CPU 31 has determined that the data of the final confirmation screen has been received, the processing proceeds to step S108.

In step S108, the CPU 31 causes the final confirmation screen to be displayed on the lower LCD 12 or the upper LCD 22, based on the data of the final confirmation screen received in step S107. Here, in the final confirmation screen, a "final confirmation" controller is displayed so as to make a final confirmation of the purchase of the application of which the application introduction screen is displayed. Thereafter, the processing proceeds to step S109.

In step S109, the CPU 31 determines whether or not the user has selected the "final confirmation" controller displayed in the final confirmation screen. If the determination in step S109 is YES, the processing proceeds to step S110. If the determination is NO, the case-of-application-selection process ends, and the processing proceeds to step S75 of FIG. 15.

In step S110, the CPU 31 transmits a final purchase request and settlement information to the server 4. Here, the settlement information includes, for example, a credit card number and a user ID in the service provided by the server 4. It should be noted that when the settlement information is a credit card number or the like, the CPU 31 causes the user to input the number, and then transmits the input number. Thereafter, the processing proceeds to step S111.

In step S111, the CPU 31 waits until it receives the application purchased from the server 4. When the application has been received, the processing proceeds to step S112.

In step S112, the CPU 31 stores the received application in the storage data memory 34. Thereafter, the case-of-application-selection process ends, and the processing proceeds to step S75 of FIG. 15.

[Data Distribution Process by Server 4]

Figure 19:
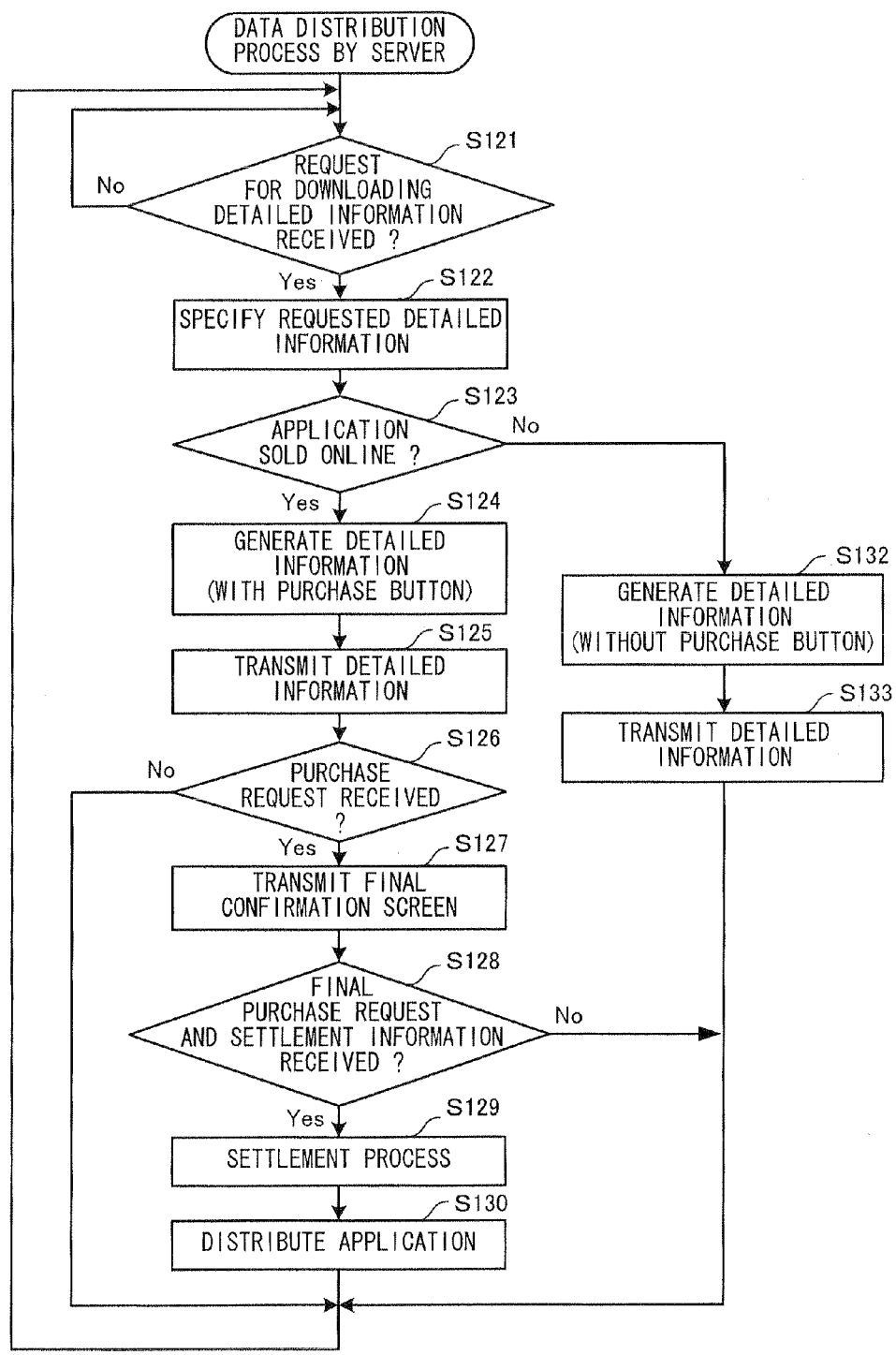
FIG. 19 is a flow chart showing an example of a data distribution process performed by the server 4.

With reference to FIG. 19, a description is given below of an example of a process performed by the server 4 of distributing the detailed information and the application to the game apparatus 1 that performs the case-of-application-selection process.

First, in step S121, the CPU 65 waits until it receives a download request for detailed information. When a download request has been received, the processing proceeds to step S122. It should be noted that the request is transmitted from the game apparatus 1 in step S101 of FIG. 18.

In step S122, the CPU 65 searches the table T (see FIG. 4) stored in the RAM 64, using the metadata included in the download request for detailed information received in step S121, and thereby specifies the detailed information about the application corresponding to the metadata. Thereafter, the processing proceeds to step S123.

In step S123, with reference to the online sales information in the table T stored in the RAM 64, the CPU 65 determines whether or not the application corresponding to the metadata included in the download request for the detailed information received in step S121 is sold online through the server 4. If the determination in step S123 is YES, the processing proceeds to step S124. If the determination is NO, the processing proceeds to step S132.

In step S124, the CPU 65 generates detailed information for allowing the game apparatus 1 to display an application introduction screen in step S103 of FIG. 18. Here, the detailed information generated in step S124 is used to display the application introduction screen including the "purchase button" controller described in step S105 of FIG. 18 and the like. Thereafter, the processing proceeds to step S125. That is, the detailed information generated in step S124 includes an image introducing the application, a description of the application, and information necessary for the user to make a decision to purchase the application, such as the necessary amount of money to purchase the application, and also includes information for providing a user interface for receiving a purchase operation of the application from the user.

In step S125, the CPU 65 transmits the detailed information generated in step S124, via the network 3 to the game apparatus 1 (hereinafter referred to as a "destination game apparatus 1") that has made the download request for the detailed information, which has been received in step S121. Thereafter, the processing proceeds to step S126.

In step S126, the CPU 65 waits for a predetermined period of time to determine whether or not a purchase request has been received from the destination game apparatus 1. It should be noted that the purchase request is transmitted from the destination game apparatus 1 in step S106 of FIG. 18. If the determination in step S126 is YES, the processing proceeds to step S127. If the determination is NO, the processing returns to step S121.

In step S127, the CPU 65 reads data of a final confirmation screen from the RAM 64, and transmits the data to the destination game apparatus 1 via the network 3. It should be noted that the data of the final confirmation screen is received by the destination game apparatus 1 in step S107 of FIG. 18. Thereafter, the processing proceeds to step S128.

In step S128, the CPU 65 waits for a predetermined period of time to determine whether or not a final purchase request and settlement information have been received from the destination game apparatus 1. It should be noted that the final purchase request and the settlement information are transmitted from the destination game apparatus 1 in step S110 of FIG. 18. If the determination in step S128 is YES, the processing proceeds to step S129. If the determination is NO, the processing returns to step S121.

In step S129, the CPU 65 performs a settlement process. The settlement process is, for example, a settlement process based on a credit card number. Further, if the server 4 manages user points in association with user IDs, the settlement process is, for example, a process of subtracting points corresponding to the value of the application to be distributed, from the user points of the user. Thereafter, the processing proceeds to step S130.

In step S130, the CPU 65 distributes the application to be distributed to the destination game apparatus 1 via the network 3. It should be noted that the distributed application is received by the destination game apparatus 1 in step S111 of FIG. 18. Thereafter, the processing returns to step S121.

In step S132, on the other hand, the CPU 65 generates detailed information for displaying an application introduction screen of the application requested by the game apparatus 1 in step S101 of FIG. 18. Here, the detailed information generated in step S132 is used to display the application introduction screen not including the "purchase button" controller described in step S105 of FIG. 18 and the like. Thereafter, the processing proceeds to step S133.

In step S133, the CPU 65 transmits the detailed information to the destination game apparatus 1 via the network 3. Thereafter, the processing returns to step S121.

Based on the present embodiment described above, the user of the game apparatus 1 can introduce to the user of another game apparatus 1 an application that has been, for example, purchased, stored in a storage area of the own apparatus (including a storage area of the cartridge 29 or the memory card 28 accommodated in the own apparatus), and played, together with a message, such as an impression of playing the application. In other words, the user of said another game apparatus 1 to which the application is introduced receives an introduction to the application together with the impression or the like from the user who has actually played the application. Consequently, based on the present embodiment, it is possible to maintain a high reliability of the introduction to a content (article) between users.

Further, based on the present embodiment, the user of the game apparatus 1 can paste, to a message, the metadata of an application (for example, an icon for, or a title of, the application) to be introduced, and introduce the application to the user of another game apparatus 1. The user having received the introduction can select the metadata pasted to the introduction message, and thereby download the introduced application from the server 4 after confirming the content and the like of the application.

Further, based on the present embodiment, the user of the game apparatus 1 can transfer an introduction message received from the user of another game apparatus 1 to (the user of) a third game apparatus 1. With this, the user of the third game apparatus receives an introduction to an application together with an impression from the user who has actually played the application. Consequently, even when an introduction message is transferred, it is possible to maintain a high reliability of the introduction to a content (article) between users.

(Variations of the Present Embodiment)

Further, in the present embodiment, the metadata of the card application is registered in the metadata database 200 when the cartridge 29 is inserted into the game apparatus 1. The metadata of the card application, however, may be registered in the metadata database 200, not when the cartridge 29 is inserted, but when the card application is started. In this case, the processes of steps S4 and S7 are eliminated from the main process of FIG. 10.

Further, in the present embodiment, the card application is stored in the cartridge 29 or the memory card 28. The card application, however, may be stored in an optical disc or another type of storage medium.

Further, in the above embodiment, the present invention is applied to the game apparatus 1, but the present invention is not limited to a game apparatus. For example, the present invention is also applicable to a mobile phone, a personal handyphone system (PHS), a personal digital assistant (PDA), and the like. Furthermore, the present invention is also applicable to a stationary game apparatus, a personal computer, and the like.

Further, in the present embodiment, a single server 4 performs the processing described above. However, a plurality of servers may share the processing described above. For example, the configuration may be such that; a server performs a process of providing detailed information to the game apparatus 1; another server performs a process of causing a settlement screen (settlement-related information) to be displayed in the game apparatus 1; and yet another server performs a settlement process, and thereby the purchased application is transmitted to the game apparatus 1. Furthermore, in the present embodiment, a single game apparatus 1 performs the processing described above. However, a plurality of apparatuses capable of communicating with one another in a wired or wireless manner may share the processing described above.

Further, the process of purchasing the application (see FIGS. 18 and 19) described in the present embodiment may be performed in various possible forms as follows. For example, settlement information, such as credit card information, may be input when the application is purchased. Alternatively, an instruction may simply be given to purchase the application, because the settlement information has already been input (transmitted to the server 4), or the bill is charged at a later date. Still alternatively, a password or the like may be requested for identification, although the settlement information has already been input.

Further, in the present embodiment, in the process of purchasing the application (see FIGS. 18 and 19), the application to be distributed is specified using the metadata (typically, an icon for, or a title of, the application) (see the descriptions of S101 of FIGS. 18 and S122 of FIG. 19). In the process of purchasing the application, however, the application to be distributed may be specified using the application ID. In this case, when the metadata is pasted to the handwritten message in step S52 of FIG. 15, the application ID (the application ID data 102c: see FIG. 6) specifying the application represented by the metadata is added to the message, together with the metadata. Then, in step S101 of FIG. 18, the CPU 31 transmits to the server 4 the application ID added to the message that has been, for example, received, and thereby makes a download request for the detailed information about the application. Then, in step 122 of FIG. 19, the CPU 65 searches the table T (see FIG. 4) stored in the RAM 64, using the application ID, and thereby specifies the detailed information about the application corresponding to the application ID.

Further, in the present embodiment, in the message application process (see FIG. 15), when a message is communicated via the server 4, communication is performed between the game apparatuses 1 via the network 3 and the server 4. In the message application process (see FIG. 15), however, when a message is communicated via the server 4, so-called P2P communication may be performed between the game apparatuses 1 via the network 3 (not via the server 4).

Further, in the present embodiment, as an example, the descriptions are given of local communication (see FIG. 16) and passing communication (see FIG. 14), using Near Field Communication in which radio waves are weak enough so as not to require a radio station license. However, the communication method of local communication (see FIG. 16) and/or passing communication (see FIG. 14) is not limited to this, and may be, for example, optical communication (infrared communication or the like).

Further, in the present embodiment, in the message application process (see FIG. 15), when the user pastes metadata to the handwritten message, the metadata to be pasted is determined with reference to the play history data 104 of the metadata database 200 (see FIG. 8). In the metadata database 200, however, only the play history data 104 and the application ID data 102c may be accumulated, and the metadata 102 (icon image data or the like) may not be accumulated. In this case, in the message application process (see FIG. 15), when the user pastes metadata to the handwritten message, the metadata to be pasted is determined with reference to the metadata 102 in the application storage area 100 (see FIG. 5).

Further, in the present embodiment, in the message application process, the metadata of an application having a play history is pasted to the handwritten message (see S50 through S52 of FIG. 15). In the message application process, however, the metadata stored in the storage data memory 34 may be pasted to the handwritten message. In this case, in step S50 of FIG. 15, with reference to the storage data memory 34, the CPU 31 causes a list of the metadata stored in the metadata database 200 (or the application storage area 100) to be displayed in the message creation screen. As a result, the user of the game apparatus 1 can introduce to the user of another game apparatus 1 an application that the user of the game apparatus 1 owns (or has owned), for example, through purchase, together with a message. In other words, the user of the game apparatus 1 receiving the introduction to the application receives the introduction to the application together with a message from the user who actually owns (or has owned) the application, for example, through purchase. Consequently, even in this case, it is possible to maintain a high reliability of the introduction to a content (article) between users.

Further, in the present embodiment, in the main process (see FIG. 10), when the cartridge 29 (or the memory card 28) has been mounted to the game apparatus 1, the application stored in the cartridge 29 or the like and the metadata corresponding to the application are stored in an accumulated manner in the storage data memory 34 (see S2 through S4). The configuration, however, may be such that the application stored in the cartridge 29 (or the memory card 28) is not stored in the storage data memory 34 (while the metadata is stored in an accumulated manner in the storage data memory 34), and the CPU 31 may read the application from the cartridge 29 (or the memory card 28) directly into the main memory 32, and execute the processing. In this case, the process of step S3 is eliminated from the main process. In the case of this configuration, the application stored in the cartridge 29 or the like mounted to the game apparatus 1 does not need to be stored in an accumulated manner in the storage data memory 34. This makes it possible to save the storage capacity of the storage data memory. This also makes it possible to avoid the situation where a single cartridge 29 or the like is mounted to a large number of game apparatuses 1 one after another, and thereby the application stored in the single cartridge 29 or the like is copied one after another.

Further, in the present embodiment, the passing communication of a message or the like is performed between the game apparatus 1 and unspecified communication partner apparatuses by the passing communication process (see FIG. 14). In the passing communication process, however, communication may be performed between the game apparatus 1 and only (the game apparatuses 1 of) friends registered in the friend list data 400 (see FIG. 5). In this case, the configuration is such that in the passing communication process of FIG. 14, each game apparatus 1 determines whether or not communication partner apparatuses are those of friends, and communicates with only the communication partner apparatuses of the friends.

Further, it is understood that in the present embodiment, the shape of the game apparatus 1, the shapes, the numbers, the installation positions of the various operation buttons 14, the touch panel 13, and the like are merely illustrative, and the present invention can be achieved with other types, numbers, installation positions, and the like. Furthermore, it is understood that the processing orders used for the information processing, the setting values, the values used for determinations, and the like that are described above are also merely illustrative, and the present invention can be achieved with other orders, values, and the like within the scope of the present invention.

Further, various information processing programs executed by the game apparatus 1 according to the present embodiment may be supplied to the game apparatus 1 not only from an external storage medium, such as the cartridge 29 or the memory card 28, but also via a wireless or wired communication link. Still further, the program described above may be stored in advance in a non-volatile storage device (the storage data memory 34 or the like) included in the game apparatus 1. It should be noted that examples of an information storage medium having stored thereon the program may include, as well as a non-volatile memory, a CD-ROM, a DVD, any other optical disk storage medium similar to these, a flexible disk, a hard disk, a magnetic optical disk, a magnetic tape, and the like. Furthermore, an information storage medium for storing the program may be a volatile memory that temporarily stores the program.

While the technology has been described in detail, the foregoing description is in all aspects illustrative and not restrictive. It will be understood that numerous other modifications and variations can be devised without departing from the technology presented herein.

What is claimed is:

1. An information processing apparatus capable of communicating with another information processing apparatus, the information processing apparatus comprising:
a computer configured to perform at least executing a plurality of application programs; and
a metadata storage for storing a plurality of metadata corresponding to the plurality of application programs;
wherein the computer further performs:
receiving a message input by a user based on an operation of the user;
subsequently selecting the metadata, from a list of the plurality of metadata, stored by the metadata storage, in accordance with an operation of the user;
and then adding the selected metadata to a predetermined position within the message;
transmitting the received message and the selected metadata to said another information processing apparatus;
receiving a message and metadata corresponding to an application program from said another information processing apparatus;
outputting the received message and the metadata, the information processing apparatus further comprising
an execution history storage for storing an execution history of the application program which has already been executed by the computer, wherein based on the execution history stored by the execution history storage, the computer allows the user to select the metadata according to the execution history of the application program, wherein
the execution history comprises information related to portions of the application program which have already been executed, wherein,
the computer is further configured to perform detailed information acquisition for, based on the received metadata, acquiring detailed information different than the received metadata about the application program corresponding to the metadata, wherein the computer outputs the acquired detailed information, wherein
the detailed information is information describing the content of the application program, wherein
the metadata stored by the metadata storage includes an icon representing the application program, and the received metadata includes an icon representing the application program, and wherein
after the user selects the icon by entering an input to the information processing apparatus, the computer outputs the acquired detailed information and subsequently downloads the application program corresponding to the metadata in accordance with an instruction from the user, wherein
there is a non-zero time lag between the end of the execution of an application program by the information processing apparatus and the transmitting of the received message and the selected metadata to said another information processing apparatus.

2. The information processing apparatus according to claim 1, wherein
the computer further performs metadata acquisition for acquiring the metadata from a first storage section or a second storage section having stored therein the plurality of application programs and the plurality of metadata corresponding to the plurality of application programs and causing the metadata storage to store the acquired metadata, the first storage section detachably attached to the information processing apparatus, the second storage section included in the information processing apparatus.

3. The information processing apparatus according to claim 1, wherein
the computer provides to the user an input interface for receiving the message input by the user, and provides an operation portion for the user to select the metadata, in the provided input interface.

4. The information processing apparatus according to claim 1, wherein
the metadata storage stores the metadata corresponding to the application program which has already been executed by the computer, and the computer allows the user to select, in accordance with the operation of the user, the stored metadata, the metadata corresponding to the application program which has already been executed by the computer.

5. The information processing apparatus according to claim 2, wherein when the first storage section is mounted to the information processing apparatus, the computer acquires the metadata stored in the first storage section, and causes the metadata storage to store the metadata.

6. The information processing apparatus according to claim 1, wherein
the detailed information includes guide information for the user to purchase the application program corresponding to the received metadata.

7. The information processing apparatus according to claim 1, the computer further configured to perform:
receiving an input provided by the user to the outputted metadata; and
when the computer has received the input provided by the user, connecting to a server through which the application program corresponding to the metadata is to be purchased.

8. The information processing apparatus according to claim 7, wherein
based on the outputted metadata, the computer connects to a site established in the server, on which the application program corresponding to the metadata is to be purchased.

9. The information processing apparatus according to claim 1, wherein
the detailed information includes introduction information for introducing to the user the application program corresponding to the received metadata.

10. The information processing apparatus according to claim 1, wherein
the computer acquires the detailed information from a server.

11. The information processing apparatus according to claim 6, wherein
the guide information guides the user to a purchase operation of the application program corresponding to the received metadata, and the computer receives and acquires the detailed information from a server, the computer of the information processing apparatus further configured to perform:
receiving the purchase operation performed by the user in accordance with the guide information;
transmitting to the server a purchase request for the application program of which the purchase operation has been received; and
receiving from the server the application program for which the purchase request has been made.

12. The information processing apparatus according to claim 6, wherein
the guide information guides the user to a purchase operation of the application program corresponding to the received metadata, and the computer receives and acquires the detailed information from a server, the computer of the information processing apparatus further configured to perform:
receiving the purchase operation performed by the user in accordance with the guide information;
transmitting to the server a purchase request for the application program of which the purchase operation has been received;
receiving, from the server, settlement-related information for guiding the user to an input operation of settlement information;
outputting the settlement-related information;
receiving the input of the settlement information provided by the user in accordance with the guide of the settlement-related information;
transmitting to the server the received settlement information; and
receiving from the server the application program for which the purchase request has been made.

13. The information processing apparatus according to claim 1, wherein
the metadata stored by the metadata storage includes a title of the application program corresponding to the stored metadata, and the received metadata includes a title of the application program corresponding to the received metadata.

14. The information processing apparatus according to claim 1, wherein
the computer further performs transferring the received message and the metadata to a third information processing apparatus.

15. The information processing apparatus according to claim 1, the computer further configured to perform:
an execution state determination for determining whether or not a state of the executed application program has entered a predetermined state; and
message acquisition for, when it is determined that the execution state has entered the predetermined state, acquiring a message and the metadata that are related to the application program that is being executed, wherein the computer transmits the acquired message and the metadata to said another information processing apparatus.

16. An information processing system capable of communicating with another information processing system, the information processing system comprising:
a computer configured to perform at least executing a plurality of application programs; and
a metadata storage for storing a plurality of metadata corresponding to the plurality of application programs;
wherein the computer further performs:
receiving a message input by a user based on an operation of the user;
subsequently selecting the metadata, from a list of the plurality of metadata, stored by the metadata storage, in accordance with an operation of the user;
and then adding the selected metadata to a predetermined position within the message;
transmitting the received message and the selected metadata to said another information processing system;
receiving a message and metadata corresponding to an application program from said another information processing system;
outputting the received message and the metadata, the information processing system further comprising
an execution history storage for storing an execution history of the application program which has already been executed by the computer, wherein based on the execution history stored by the execution history storage, the computer allows the user to select the metadata according to the execution history of the application program, wherein
the execution history comprises information related to portions of the application program which have already been executed, wherein,
the computer is further configured to perform detailed information acquisition for, based on the received metadata, acquiring detailed information different than the received metadata about the application program corresponding to the metadata, wherein the computer outputs the acquired detailed information, wherein the detailed information is information describing the content of the application program, wherein the metadata stored by the metadata storage includes an icon representing the application program, and the received metadata includes an icon representing the application program, and wherein after the user selects the icon by entering an input to the information processing system, the computer outputs the acquired detailed information and subsequently downloads the application program corresponding to the metadata in accordance with an instruction from the user, wherein there is a non-zero time lag between the end of the execution of an application program by the information processing system and the transmitting of the received message and the selected metadata to said another information processing system.

17. A non-transitory computer-readable storage medium having stored thereon an information processing program executed by a computer of an information processing apparatus capable of communicating with another information processing apparatus, the information processing program causing the computer to perform at least:

executing a plurality of application programs;

storing a plurality of metadata corresponding to the plurality of application programs;

receiving a message input by a user based on an operation of the user;

subsequently selecting the stored metadata, from a list of the plurality of metadata, in accordance with an operation of the user;

and then adding the selected metadata to a predetermined position within the message;

transmitting the received message and the selected metadata to said another information processing apparatus;

receiving a message and metadata corresponding to an application program from said another information processing apparatus;

outputting the message and the received metadata and storing an execution history of the application program which has already been executed, wherein based on the stored execution history, the selecting allows the user to select the metadata according to the execution history of the application program, wherein the execution history comprises information related to portions of the application program which have already been executed, wherein, the computer is further configured to perform detailed information acquisition for, based on the received metadata, acquiring detailed information different than the received metadata about the application program corresponding to the metadata, wherein the computer outputs the acquired detailed information, wherein the detailed information is information describing the content of the application program, wherein the stored metadata includes an icon representing the application program, and the received metadata includes an icon representing the application program, and wherein after the user selects the icon by entering an input to the information processing apparatus, the computer outputs the acquired detailed information and subsequently downloads the application program corresponding to the metadata in accordance with an instruction from the user, wherein there is a non-zero time lag between the end of the execution of an application program by the information processing apparatus and the transmitting of the received message and the selected metadata to said another information processing apparatus.

18. An information processing method performed by an information processing apparatus capable of communicating with another information processing apparatus, the information processing method comprising:

executing a plurality of application programs;

storing a plurality of metadata corresponding to the plurality of application programs;

receiving a message input by a user based on an operation of the user;

subsequently selecting the stored metadata, from a list of the plurality of metadata, in accordance with an operation of the user;

and then adding the selected metadata to a predetermined position within the message;

transmitting the received message and the selected metadata to said another information processing apparatus;

receiving a message and metadata corresponding to an application program from said another information processing apparatus;

outputting the message and the received metadata and storing an execution history of the application program which has already been executed, wherein based on the stored execution history, the selecting allows the user to select the metadata according to the execution history of the application program, wherein the execution history comprises information related to portions of the application program which have already been executed, wherein, the information processing method further comprising detailed information acquisition for, based on the received metadata, acquiring detailed information different than the received metadata about the application program corresponding to the metadata, and outputting the acquired detailed information, wherein the detailed information is information describing the content of the application program, wherein the stored metadata includes an icon representing the application program, and the received metadata includes an icon representing the application program, and wherein after the user selects the icon by entering an input to the information processing apparatus, the information processing method further comprising outputting the acquired detailed information and subsequently downloading the application program corresponding to the metadata in accordance with an instruction from the user, wherein there is a non-zero time lag between the end of the execution of an application program by the information processing apparatus and the transmitting of the received message and the selected metadata to said another information processing apparatus.

* * * * *